(12) United States Patent
Mitarai et al.

(10) Patent No.: US 8,002,006 B2
(45) Date of Patent: Aug. 23, 2011

(54) RUNFLAT TIRE

(75) Inventors: Yasuo Mitarai, Kobe (JP); Takaaki Ishida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 716 days.

(21) Appl. No.: 11/987,711

(22) Filed: Dec. 4, 2007

(65) Prior Publication Data

US 2008/0128066 A1    Jun. 5, 2008

(30) Foreign Application Priority Data

Dec. 5, 2006   (JP) .................... 2006-328570
Dec. 5, 2006   (JP) .................... 2006-328571

(51) Int. Cl.
*B60C 17/00*   (2006.01)
*B60C 17/04*   (2006.01)
*B60C 17/08*   (2006.01)
*B60C 13/00*   (2006.01)

(52) U.S. Cl. .................... 152/516; 152/517; 152/523

(58) Field of Classification Search .................... 152/523
See application file for complete search history.

(56) References Cited

FOREIGN PATENT DOCUMENTS

| JP | 50-78003 | | 6/1975 |
|---|---|---|---|
| JP | 2994989 B2 | | 10/1999 |
| JP | 2002-301911 A | | 10/2002 |
| JP | 2003-19904 | * | 1/2003 |
| JP | 2004-268714 A | | 9/2004 |
| JP | 2005-67315 A | | 3/2005 |
| JP | 2005-273074 | * | 10/2006 |

* cited by examiner

*Primary Examiner* — Justin Fischer
(74) *Attorney, Agent, or Firm* — Birch, Stewart, Kolasch & Birch, LLP

(57) ABSTRACT

A runflat tire comprises a tread portion, a pair of sidewall portions, a pair of bead portions each having a bead core therein, a carcass extending between the bead cores, and a sidewall reinforcing rubber disposed axially inside the carcass in each sidewall portion, wherein each sidewall reinforcing rubber is provided with a plurality of grooves extending on an axially inner surface thereof, each groove has a radially outer end and a radially inner end within the inner surface of the sidewall reinforcing rubber, the grooves are arranged in a circumferential direction of the tire, a length of the groove is in a range of from 30 to 50 mm, a width of the groove is in a range of from 10 to 20 mm and a circumferential pitch of the groove is in a range of from 25 to 60 mm.

15 Claims, 22 Drawing Sheets

US 8,002,006 B2

RUNFLAT TIRE

BACKGROUND OF THE INVENTION

1. Field of the Invention

The present invention relates to a runflat tire, more particularly to a sidewall structure capable of improving ride comfort and weight reduction without deteriorating runflat performance.

2. Description of the Related Art

A runflat tire which is provided in each sidewall portion with a sidewall reinforcing rubber having a substantially crescent shape has been proposed, for example as shown in Japanese Patent Publications of JP-2002-301911A1, JP-2994989B1 and JP-2005-67315A1. The crescent-shaped sidewall reinforcing rubber is disposed axially inside the carcass in order to increase the bending rigidity of the tire sidewall portion to thereby support the tire load during runflat conditions such as puncture.

In this structure, however, as the bending rigidity is increased always, namely, during normal running and runflat conditions, deterioration in the ride comfort during normal running is inevitable. Further, a fuel efficiency of a car with runflat tires tends to become worse, since the sidewall reinforcing rubber makes tire weight increase.

SUMMARY OF THE INVENTION

It is therefore, an object of the present invention to provide a runflat tire, in which the ride comfort and weight reduction can be improved without deteriorating the runflat performance.

According to the present invention, a runflat tire comprises a tread portion, a pair of sidewall portions, a pair of bead portions each having a bead core therein, a carcass extending between the bead cores, and a sidewall reinforcing rubber disposed axially inside the carcass in each sidewall portion, wherein each sidewall reinforcing rubber is provided with a plurality of grooves extending on an axially inner surface thereof.

In one aspect of the present invention, each groove has a radially outer end and a radially inner end on the inner surface of the sidewall reinforcing rubber, the grooves are arranged in a circumferential direction of the tire, a length of the groove is in a range of from 30 to 50 mm, a width of the groove is in a range of from 10 to 20 mm and a circumferential pitch of the groove is in a range of from 25 to 60 mm.

Further, in the other aspect of the present invention, said grooves comprise a plurality of radially extending first grooves arranged in a circumferential direction of the tire and at least one circumferentially extending second groove provided between said first grooves.

DETAILED DESCRIPTION OF THE PREFERRED EMBODIMENTS

Figure 1:
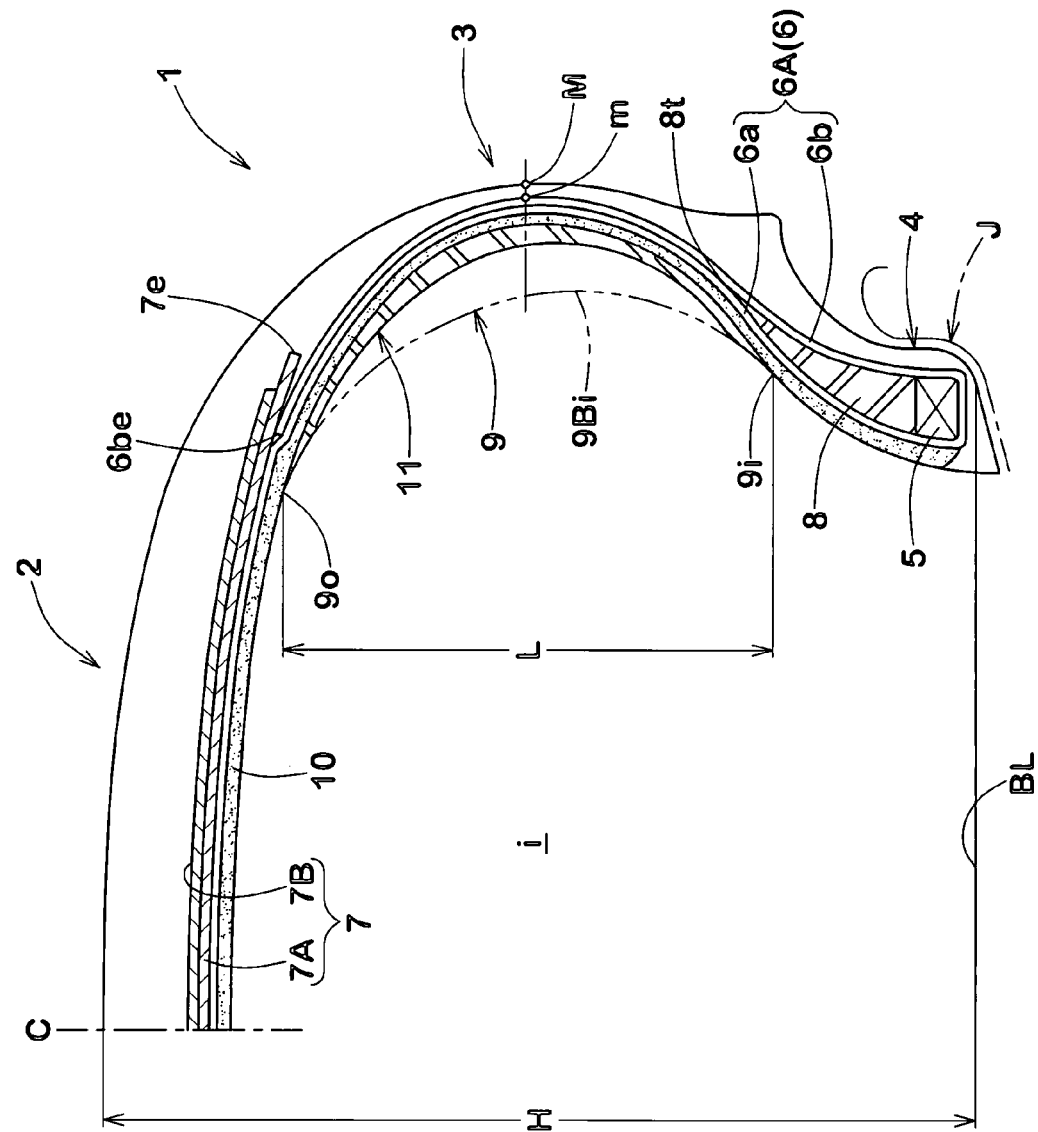
FIG. 1 is a cross sectional view of a runflat tire according to the present invention.
Figure 2:
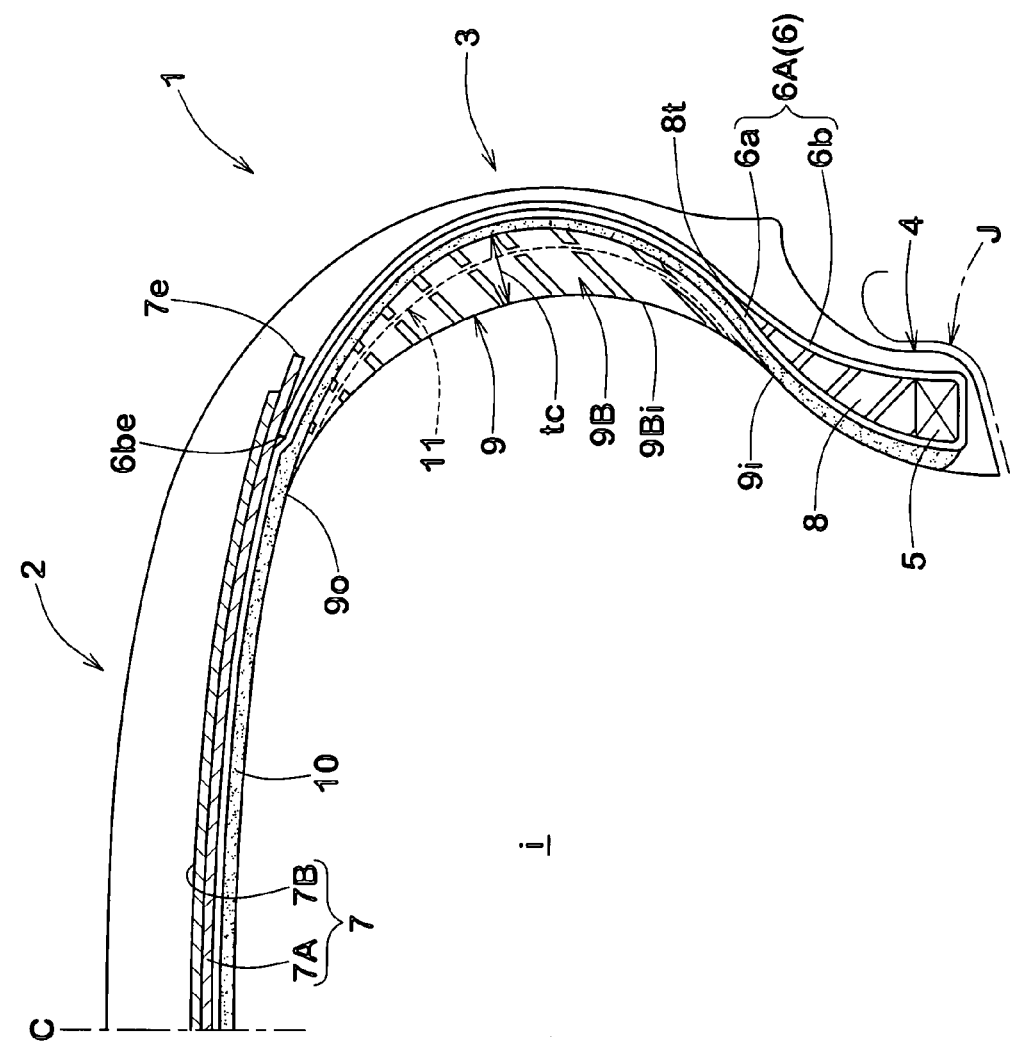
FIG. 2 is a cross sectional view of the runflat tire of FIG. 1 in different section.

FIG. 1 shows a runflat tire under a normally inflated unloaded state according to the present invention, and FIG. 2 shows the runflat tire in a different cross section from FIG. 1 in a circumferential direction of the tire. In this specification, when there is no annotation in particular, each value of the tire means a value under the normally inflated unloaded state.

Here, the normally inflated unloaded state is such that the runflat tire 1 is mounted on a standard wheel rim j and inflate to a standard pressure but loaded with no tire load. Further, the standard wheel rim is a wheel rim officially approved for the tire by standard organization, i.e. JATMA, TRA, ETRTO and the like. The standard pressure is the maximum air pressure for the tire specified by the same organization in the Air-pressure list. For example, the standard wheel rim is the "standard rim" specified in JATMA, the "Measuring Rim" in ETRTO, and the "Design Rim" in TRA or the like. The standard pressure is the "maximum air pressure" in JATMA, the "Inflation Pressure" in ETRTO, and the maximum pressure given in the "Tire Load Limits at various cold Inflation Pressures" table in TRA or the like. In case of passenger car tires, however, the standard pressure is uniformly defined by 180.

The runflat tire 1 According to the present invention comprises: a tread portion 2; a pair of axially spaced bead portions 4 each with a bead core 5 therein; a pair of sidewall portions 3 extending between the tread edges and the bead portions 4; a carcass 6 extending between the bead portions 4; a belt 7 disposed radially outside the carcass 6 in the tread portion 2; a tapered bead apex 8 extending radially outwardly from the radially outside of the bead core 5 in each of the bead portion 4; an inner liner 10 of an air-impermeable rubber compound such as butyl rubber, butyl halide and/or brominated butyl rubber disposed inside the carcass 6 and extending into each bead portion 4; and a sidewall reinforcing rubber 9 disposed axially inside the inner liner 10 in each of the sidewall portions 3.

The carcass 6 comprises at least one ply 6A of rubberized cords arranged radially at an angle in the range of from 70 to 90 degrees with respect to the tire equator C, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of a single ply 6A. As for the carcass cord, organic fiber cords, e.g. aromatic polyamide, nylon, polyester, rayon and the like can be used alone or in combination.

The bead apex 8 is disposed between the main portion 6a and the turnup portion 6b of the carcass ply 6A. The bead apex 8 is made of a hard rubber with a JIS A hardness of not less than 65 degrees, more preferably not less than 70 degrees, but not more than 95 degrees, more preferably not more than 90 degrees in order to increase the bending rigidity of the bead portion 4 and improve stability during cornering.

In this embodiment, each turnup portion 6b of the carcass ply 6A extends through the sidewall portion 3 to the tread portion 2 and its each end 6be terminates between the main portion 6a and the belt 7, such a carcass ply 6A may effectively reinforce the sidewall portions 3 with a small amount of plies.

The belt 7 comprises at least two cross plies 7A and 7B of belt cords laid at an angle of from 10 to 35 degrees with respect to the tire equator C. In this embodiment, the belt 7 consists of the two cross plies 7A and 7B of steel cords.

As shown in FIG. 1, the sidewall reinforcing rubber 9 extends radially outwardly and inwardly from its center portion along the inside of the carcass 6 while tapering toward its radially outer end 9o and the inner end 9i. Further, the sidewall reinforcing rubber 9 extends continuously in the circumferential direction of the tire.

The inner end 9i of the reinforcing rubber 9 is preferably located radially inside than the radially outer end 8t of the bead apex 8 and radially outside than the bead core 5.

The outer end 9o of the reinforcing rubber 9 extends radially outwardly and preferably terminates at a position that is further axially inside than the belt edge 7e. such sidewall reinforcing rubber layer 9 can reinforce the rigidity of the sidewall portion 3 over substantially the entire region thereof so as to restrict the longitudinal deflection when performing runflat running.

While a radial length L between the inner end 9i and the outer end 9o of the sidewall reinforcing rubber 9 is not particularly limited, when the length L is too small, it will become difficult to obtain a smooth curved condition of the sidewall portions 3 when runflat running. On the other hand, when the length L is too large, the riding comfort at the time of performing normal running or the performance of rim assembly tends to be worsened. In this viewpoint, it is preferable to set the radial length L of the sidewall reinforcing rubber 9 to preferably in a range of from 35 to 70%, and more preferably in a range of from 40 to 65% the tire section height H.

Here, the tire section height H is the radial distance from the bead base line BL to the radially outermost point of the tread portion 2 under the normally inflated unloaded state of the tire.

In the case of passenger car tires or tires having similar sizes, the maximum thickness tc of the sidewall reinforcing rubber 9 is preferably not more than 20 mm, more preferably not more than 15 mm, further preferably not more than 11 mm, but not less than 5 mm, more preferably not less than 9 mm. If the maximum thickness tc is more than 20 mm, it makes the tire weight increase and difficult to improve the ride comfort. On the other hand, if the thickness tc is less than 5 mm, there is a possibility of deteriorating the runflat performance.

As to the hardness of the sidewall reinforcing rubber 9, if too small, it is difficult to reinforce the sidewall portions. If too large, it is difficult to improve the ride comfort. Therefore, the JIS type-A durometer hardness according to Japanese Industrial standard K6253 of the sidewall reinforcing rubber 9 is preferably set in the range of not less than 60 degrees, more preferably not less than 65 degrees, but not more than 95 degrees, still more preferably not more than 85 degrees.

Further, a plurality of grooves 11 are provided on an axially inner surface 9Bi of the sidewall reinforcing rubber 9. In this embodiment, the grooves 11 are arranged at distances from one another in a circumferential direction of the tire. The grooves 11 of this embodiment extend substantially in parallel to the radial direction of the tire and have the same quadrangle shapes. Further, the grooves 11 are provided with a constant pitch in the circumferential direction of the tire. Here, the reference "9B" show a part of the sidewall reinforcing rubber without no groove, and the reference "9Bi" shows the inner surface thereof.

Figure 4:
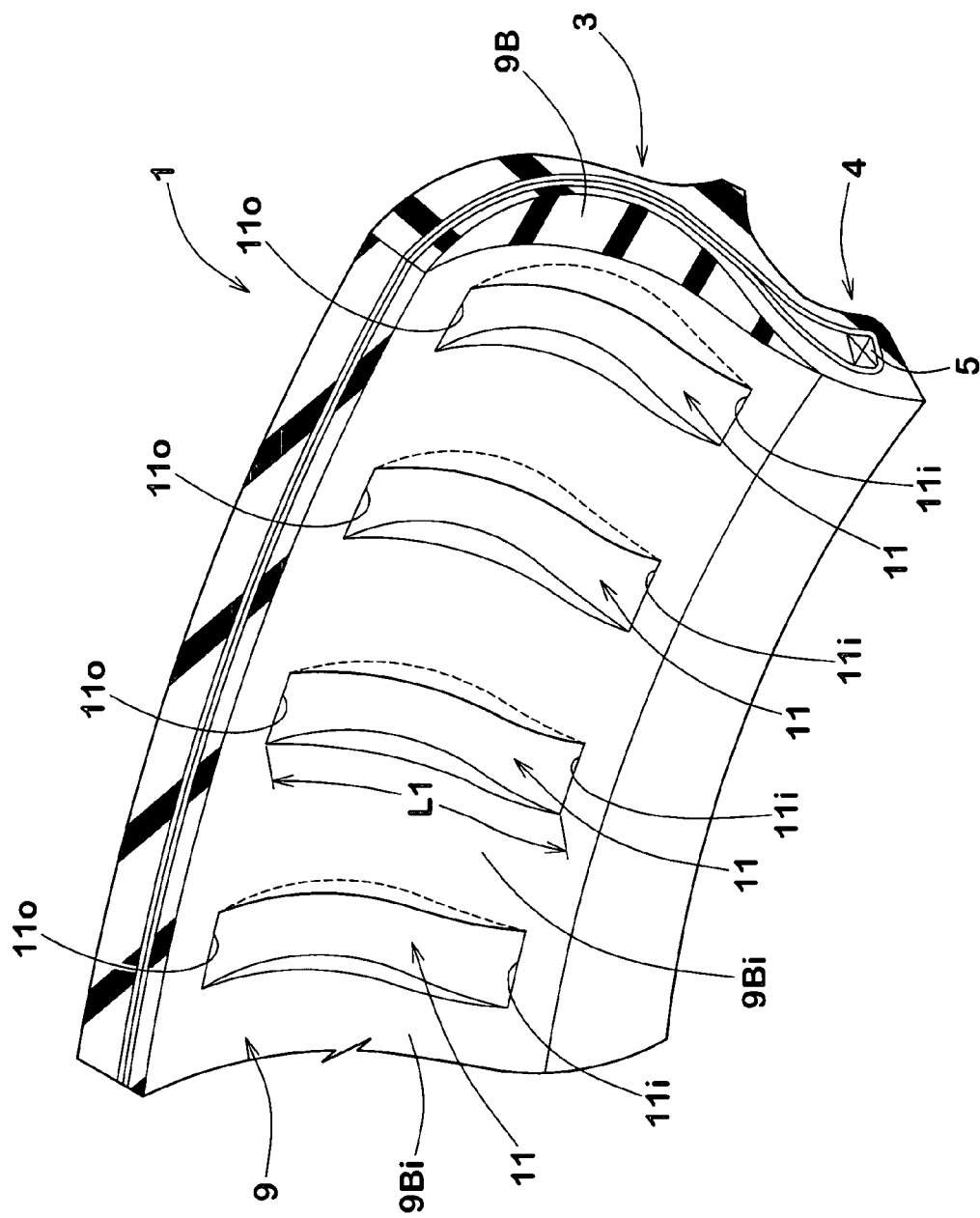
FIG. 4 is a partial perspective view of the sidewall portion viewed from the inside of the tire.
Figure 5:
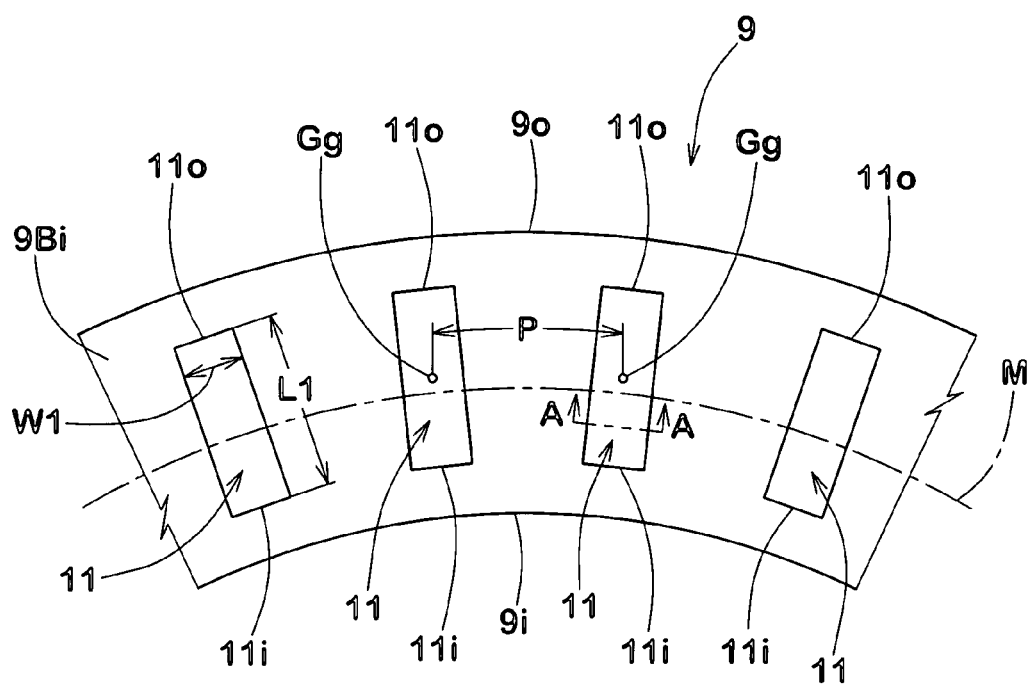
FIG. 5 is a side view of the sidewall reinforcing rubber viewed from the inside of the tire.

As shown in FIGS. 4 and 5, each groove 11 includes two ends, i.e., a radially outer end 11o and a radially inner end 11i which are provided within the inner surface 9Bi of the sidewall reinforcing rubber 9. The groove 11 of this embodiment extends across a tire maximum position M, with this structure, each ends 11i and 11o are provided on opposite sides with respect to the tire maximum width point M. Here, the tire maximum width point M is established on a tire meridian cross-section excepting letters, designs, rim protectors and the like on the sidewall portion 3, namely the maximum width point M is at the substantial same height as the point (m) which is the maximum width point of the carcass 6.

In this present invention, the maximum length L1 between the ends 11i and 11o of the groove 11 is in a range of from 30 to 50 mm, and the groove width W1 of the groove 11 is in a range of from 10 to 20 mm. Here, as shown in FIG. 4, the maximum length L1 of the groove 11 is the maximum length between the radially inner end 11i and the outer end 11o, and is measured along the inner surface 9Bi of the part 9B of the sidewall reinforcing rubber 9. The width W1 of the groove 11 is an opening width, and is measured along a direction intersecting with the direction of the maximum length at right angles, when the maximum length L1 of the groove 11 is less than 30 mm or the width W1 is less than 10 mm, the rigidity (vertical rigidity) of the sidewall reinforcing rubber 9 in the tire radial direction can not sufficiently soften, and riding comfort can not be enhanced. If the maximum length L1 of the groove 11 exceeds 50 mm or the width W1 exceeds 20 mm, the rigidity of the sidewall reinforcing rubber 9 in the tire radial direction is excessively lowered, a load supporting ability is deteriorated and this deteriorates run-flat durability.

Figure 6A:
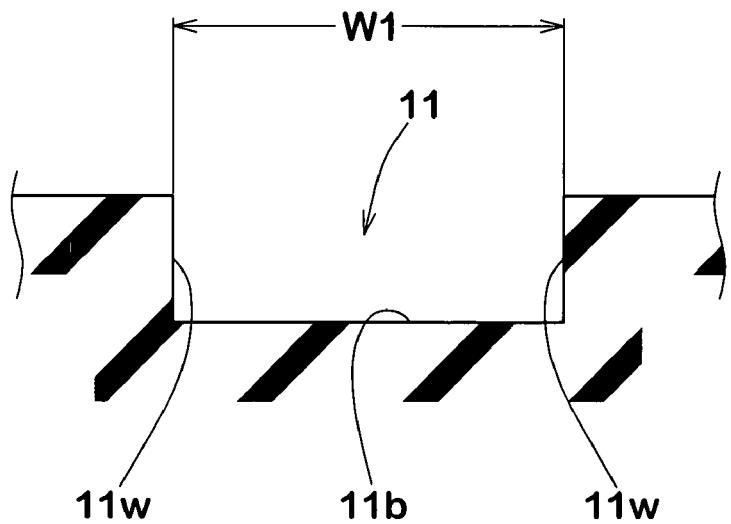
FIGS. 6(a) and 6(b) are cross sectional views taken along the line A-A in FIG. 5.
Figure 6B:
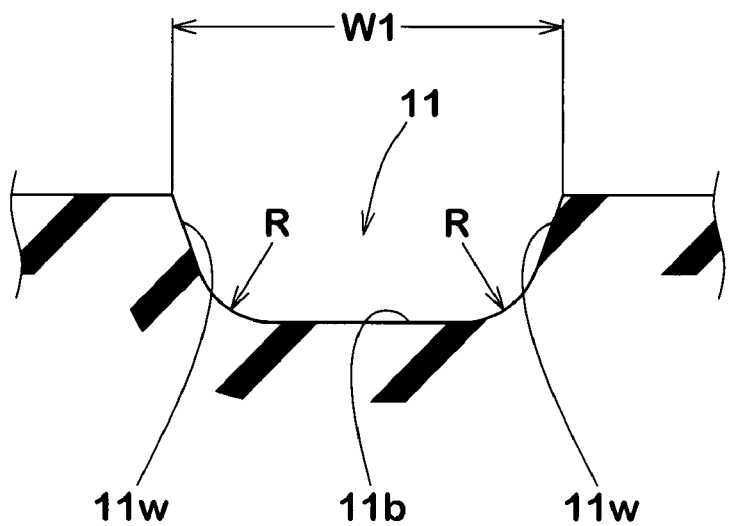

FIGS. 6(a) and 6(b) are sectional views taken along the line A-A in FIG. 5. The cross sectional shape of the groove 11 may be a rectangular shape as shown in FIG. 6(a), but preferably both side groove walls 11w are inclined such that the width W1 becomes smaller toward the groove bottom 11b, and a corner between the groove wall 11w and the groove bottom 11b is chamfered as show in FIG. 6(b). According to the groove 11 having such a cross sectional shape of FIG. 6(b), distortion at the time of runflat can prevent a crack from generating in the corner for a long term.

In this present embodiment, the grooves 11 are provided with a pitch P in a range of from 25 to 60 mm in the circumferential direction of the tire. As shown in FIG. 5, the pitch P is measured as an arc distance along the tire circumferential direction between barycenters Gg (the barycenter is a barycenter of an opening area of the groove) with respect to adjacent grooves 11.

When the pitch P of the grooves 11 is less than 25 mm, the rigidity between adjacent grooves 11 is largely lowered, a crack is generated in that portion, and the durability is deteriorated in the sidewall reinforcing rubber 9. Therefore, it is preferable that the pitch P is not less than 30 mm and more preferably not less than 35 mm. If the pitch P exceeds 60 mm, the rigidity of the sidewall reinforcing rubber 9 in the tire radial direction can not sufficiently soften, and riding comfort can not be enhanced. It is preferable that the pitch P between the grooves 11 is determined based on a relation with respect to the width W1 of the groove 11. More specifically, it is preferable that the pitch P is about two to four times of the width W1 of the groove 11.

Figure 3:
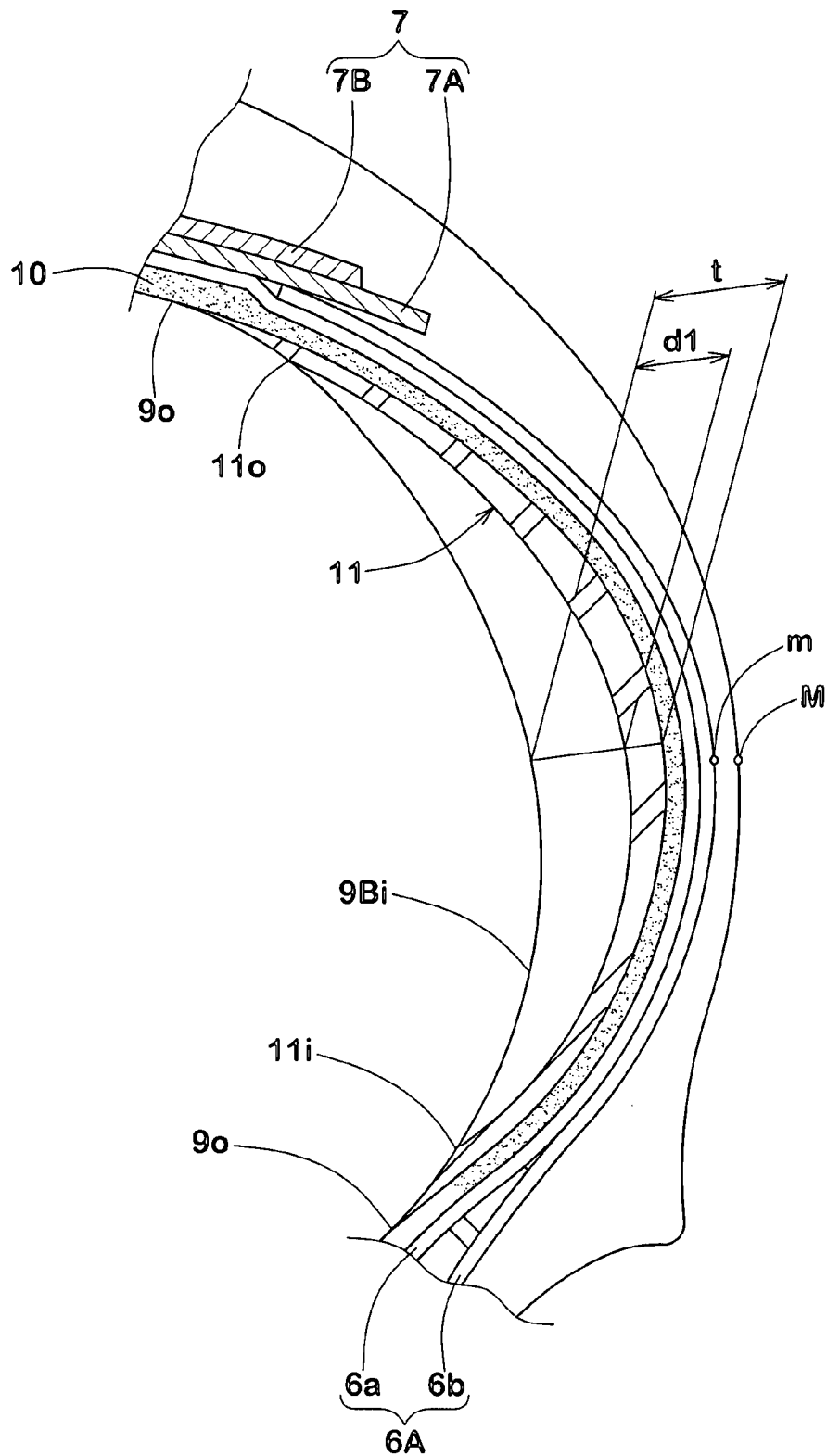
FIG. 3 is a partial enlarged view of the sidewall portion of FIG. 1.

As shown in FIG. 3, in this embodiment, a depth d1 of each groove 11 is gradually reduced toward the inner end 11*i* and the outer end 11*o* in the radial direction of the tire from the central portion in the length direction of the groove 11. That is, the depth d1 of the groove 11 is reduced as a thickness t of the sidewall reinforcing rubber 9 is reduced with this structure, in the ends 11*i* and 11*o* of the groove 11, it is possible to prevent distortions from concentrating.

The depth d1 of the groove 11 (in this specification, depth means the maximum depth if the depth is varied) is preferably not less than 2 mm and more preferably not less than 3 mm. If the depth d1 is less than 2 mm, the rigidity of the sidewall reinforcing rubber 9 in the radial direction can not sufficiently soften, and riding comfort can not be enhanced. If the depth d2 of the groove 11 is excessively large, a distortion tends to concentrate into the groove 11, and a crack is prone to be generated. In view of such circumstances, it is preferable that the depth d1 of the groove 11 is not more than 8 mm, and more preferably not more than 6 mm. If the depth d1 of the groove 11 and the thickness t of the sidewall reinforcing rubber 9 are compared with each other, it is preferable that a ratio (d1/t) thereof is not less than 0.05, more preferably not less than 0.10, and more preferably not less than 0.20. Its upper limit is preferably not more than 0.70, more preferably not more than 0.60 and more preferably not more than 0.50.

Figure 7:
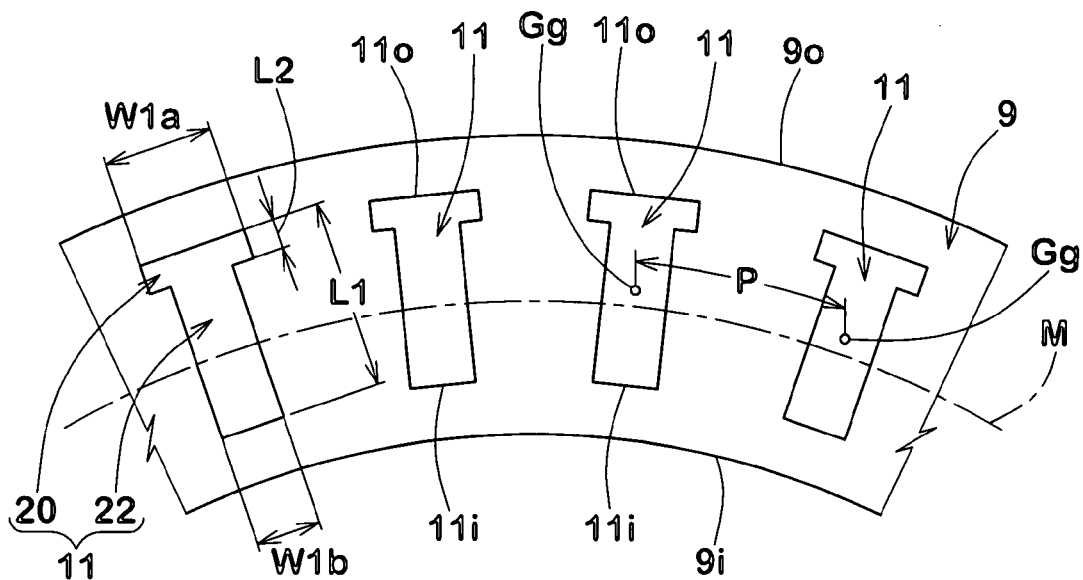
FIGS. 7 to 9 each is a side view of another embodiment of the sidewall reinforcing rubber viewed from the inside of the tire.

In this embodiment, the groove 11 extends with the constant width W1 from the inner end 11*i* to outer end 11*o*. However, as shown in FIG. 7, the groove 11 may be of a substantially T-shape including a wide width part 20 having a large width W1*a* and a narrow width part 22 with a width W1*b* smaller than that of the wide part 20 connected to the wide width part 20 so that a shape of the groove in a front view has a T-shape. According to such a T-shaped groove 11, the rigidity of the sidewall reinforcing rubber 9 in the tire radial direction is softened in a wide range in the tire circumferential direction by the wide width part 20, and reduction in rigidity of the sidewall reinforcing rubber 9 can be suppressed by the narrow width part 22. Therefore, it is possible to enhance the steering stability and the riding comfort in excellent balance.

Above all, in order to further enhance the riding comfort, it is preferable that such a substantially T-shaped groove 11 extends in the tire radial direction, the wide width part 20 is located on the side of the tread portion 2 and the narrow width part 22 is located on the side of the bead portion 4, with this structure, an impact inputted into the tread portion 2 is effectively absorbed by the wide width part 20, the reduction in rigidity of the sidewall reinforcing rubber 9 is suppressed on the side of the bead portion 4, and it is possible to effectively prevent the steering stability from being deteriorated.

In order to further enhance the riding comfort and steering stability in excellent balance, in the substantially T-shaped groove 11, it is preferable that the width W1*a* of the wide width part 20 is in a range of from 15 to 20 mm, and the width W1*b* (<W1*a*) of the narrow width part 22 is in a range of from 10 to 15 mm. If the length L2 of the wide width part 20 is excessively small, the riding comfort is not sufficiently enhanced and thus, it is preferable that the length L2 is in a range of from 5 to 10 mm.

Figure 8:
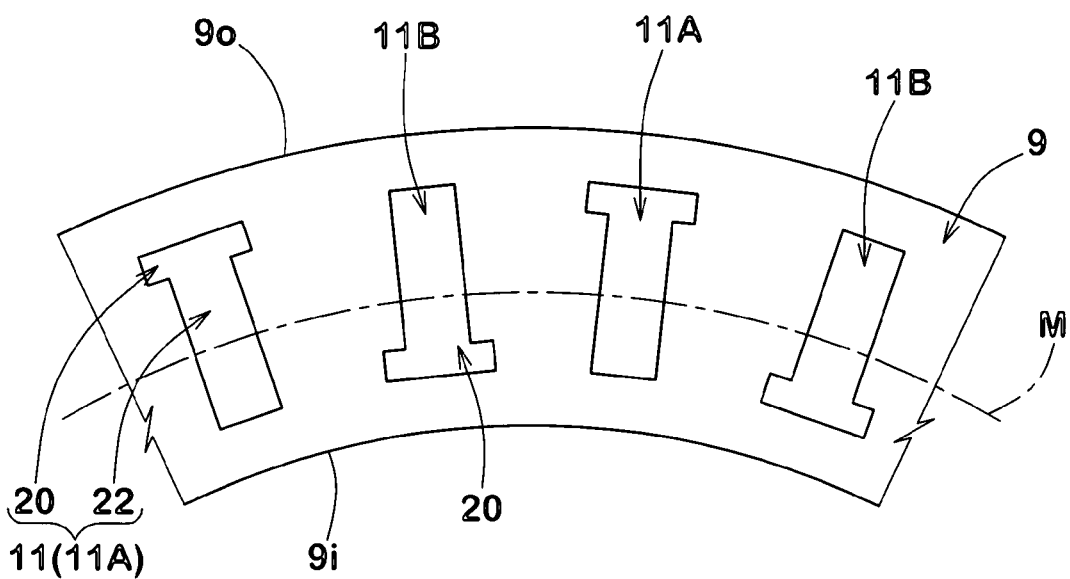

As shown in FIG. 8, the sidewall reinforcing rubber 9 may be provided with a first T-shaped groove 11A in which the wide width part 12 is directed toward the tread portion 2, and a second T-shaped groove 11B in which the wide width part 20 is directed toward the bead portion 4. In this case, it is preferable that the first T-shaped grooves 11A and the second T-shaped grooves 11B are provided alternately in the circumferential direction of the tire. At the time of runflat running, the wide width part 20 of the T-shaped groove 11 tends to be bended larger than the narrow width part 22 thereof. Accordingly, in an embodiment shown in FIG. 8, the vertical distortions at the time of runflat running can be dispersed inward and outward in the tire radial direction. Therefore, it is possible to reduce the vertical bending amount of the tire at the time of runflat running, and to suppress the heat, and the durability can be enhanced.

Figure 9:
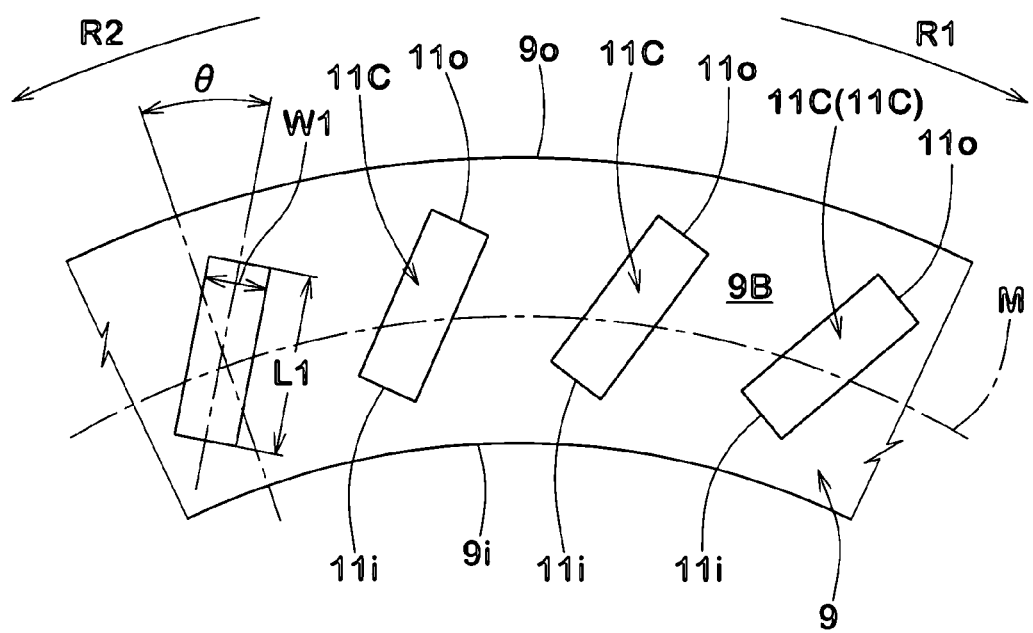

Alternatively, as shown in FIG. 9, the sidewall reinforcing rubber 9 may be provided with at least one inclined groove 11*c* inclined with respect to the radial direction of the tire. The inclined groove 11*c* can adjust the riding comfort and steering stability in the relation with respect to the rotation direction R1 or R2 of the tire (in a tire in which the rotation direction is determined, the direction is shown on the sidewall portion 3 or the like with an arrow).

Figure 10:
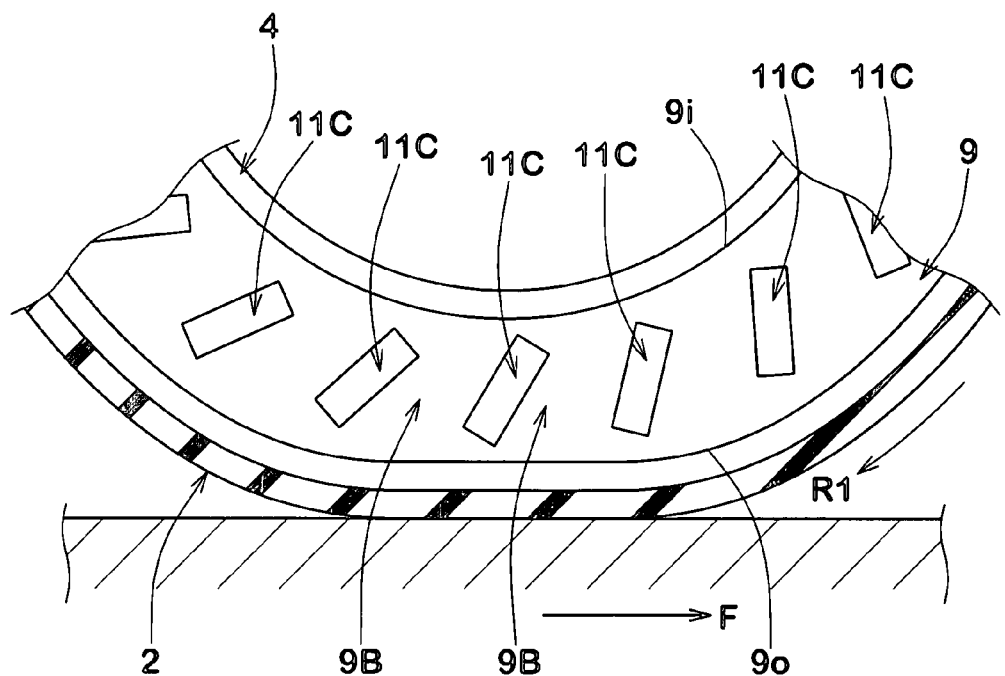
FIGS. 10 and 11 are partial sectional views of the runflat tire during running taken along the tire equator.

For example, in order to improve the steering stability of the tire 1, as shown in FIG. 10, inclined grooves 11C provided on both sidewall reinforcing rubbers 9 preferably incline to the same direction such that each inclined groove 11C extends along the rotation direction R1 of the tire from the side of the bead portion 4 toward the tread portion 2. In such an embodiment, the part 9B between the inclined grooves 11C of the sidewall reinforcing rubber 9 is inclined in a direction resisting a shearing force F received by the tire when running. Therefore, at the time of ground contact, the rigidity of the sidewall reinforcing rubber 9 in the tire circumferential direction is enhanced, and traction performance and steering stability are enhanced.

Figure 11:
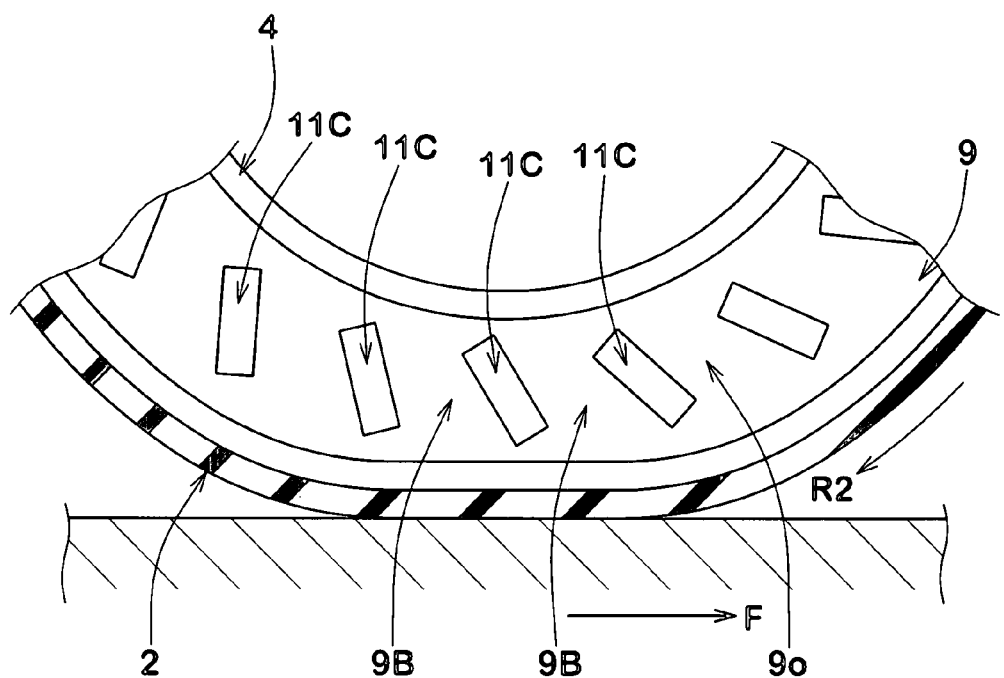
Figure 12:
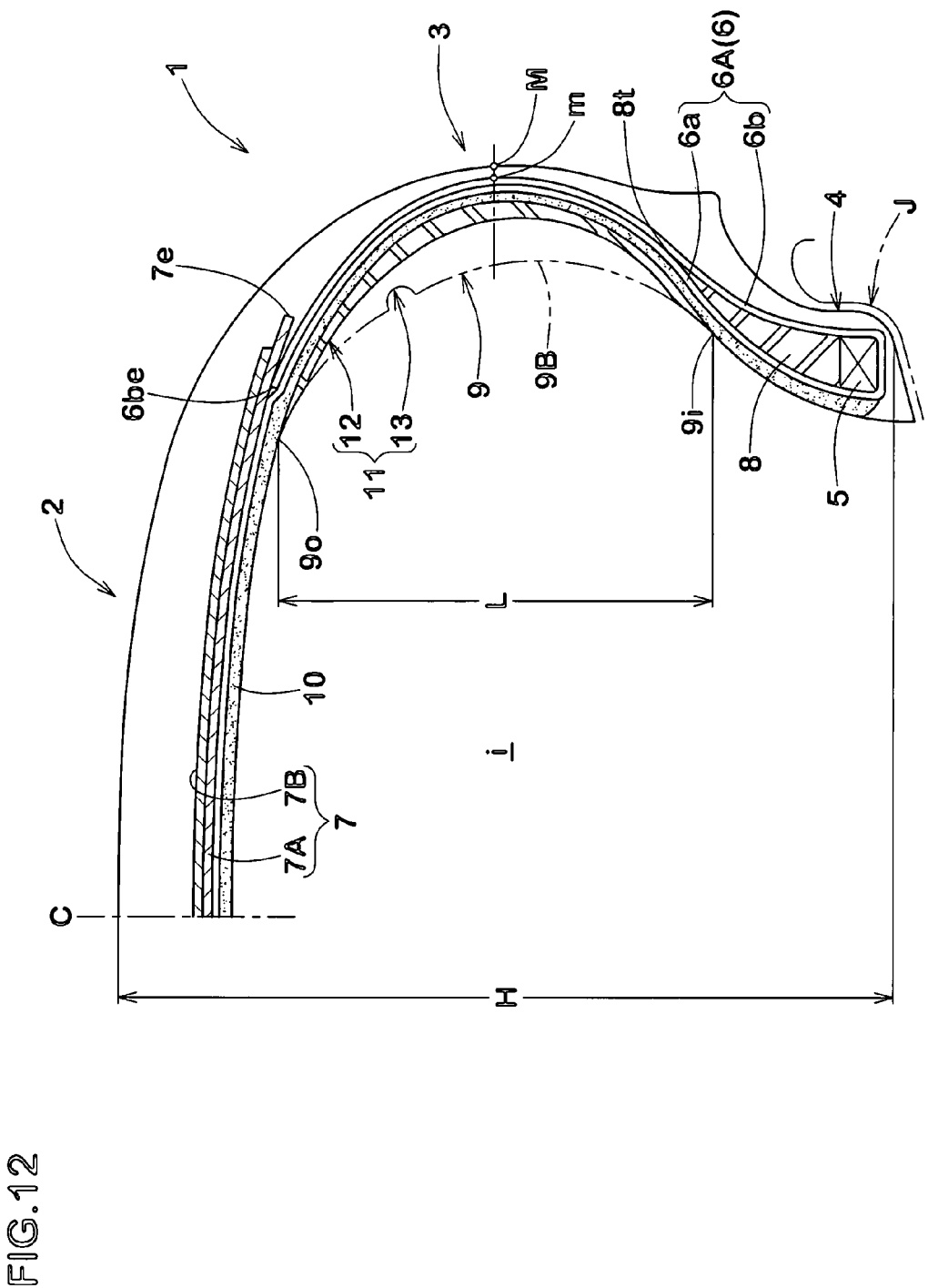
FIG. 12 is a cross sectional view of another runflat tire according to the present invention.
Figure 13:
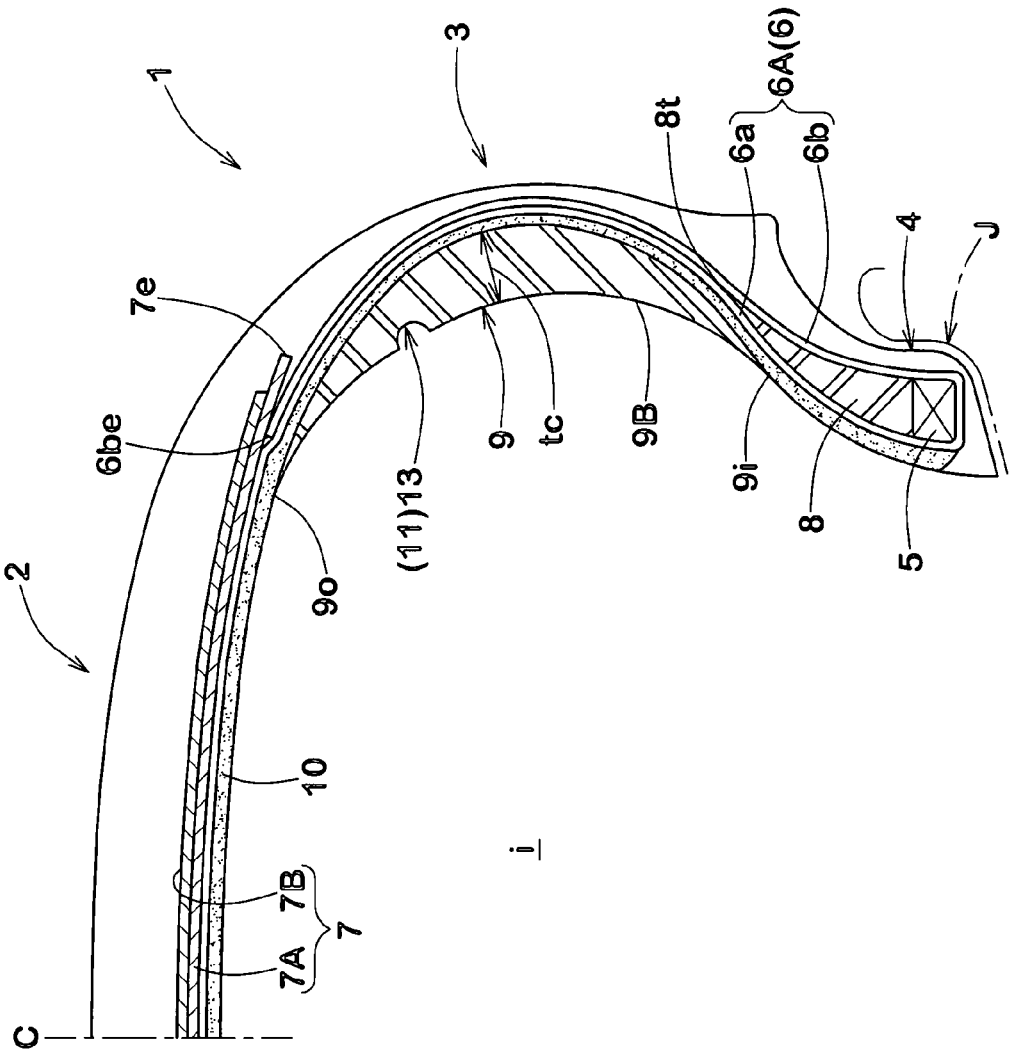
FIG. 13 is a cross sectional view of the runflat tire of FIG. 12 in different section.

On the other hand, in order to improve the riding comfort of the tire 1, as shown in FIG. 11, inclined grooves 11C provided on both sidewall reinforcing rubbers 9 preferably incline to the same direction such that each inclined groove 11C extends against the rotation direction R2 of the tire from the side of the bead portion 4 toward the tread portion 2. In such an embodiment, the part 9B between the inclined grooves 11*c* of the sidewall reinforcing rubber 9 is inclined in the same direction as the shearing force F. Therefore, deformation of the sidewall reinforcing rubber 9 in the tire radial direction is facilitated, impact moderating ability is enhanced and the riding comfort is enhanced.

In the above embodiments, the inclination angle θ (shown in FIG. 9) of the groove 11 with respect to the tire radial direction is preferably set in a range of from 25 to 65 degrees. If the angle θ is less than 25 degrees, this situation is almost the same as a case in which the groove 11 extends along the tire radial direction, and if the angle θ exceeds 65 degrees, the rigidity of the sidewall reinforcing rubber 9 is largely deteriorated, and the runflat durability is deteriorated. From such a point of view, the angle θ is more preferably not less than 30 degrees, further preferably not less than 35 degrees, and its upper limit is more preferably not more than 55 degrees, and further preferably not more than 50 degrees.

In a runflat tire 1 in which the rotation direction is determined, both the grooves 11 provided on each sidewall reinforcing rubber 9 are inclined in the same direction from the side of the bead portion 4 to the tread portion 2. At that time, it is preferable that the angles θ of the grooves 11 on each sidewall reinforcing rubber 9 are the same.

In the case of a runflat tire in which the rotation direction is not determined and which has a symmetric tread pattern with respect to a point, the tire is used in both the rotation directions. Therefore, even if the tire is used in any of the rotation directions, it is preferable that the tire characteristics are not largely varied. In such a case, it is preferable that the inclined groove 11C provided on one of the sidewall reinforcing rubbers 9 is inclined to a first direction with respect to the radial direction, and the inclined groove 11C provided on the other sidewall reinforcing rubber 9 is inclined to a second direction which is the reverse direction of the first direction with respect to the radial direction. At that time, the angles θ of the grooves 11 on the both sides are preferably the same.

FIGS. 12 to 16 show another embodiment of the runflat tire. In this embodiment, the inner surface of the sidewall reinforcing rubber 9 is provided with a plurality of radially extending first grooves 12 arranged in the circumferential direction of the tire and at least one circumferentially extending second groove 13 provided between the first grooves 12.

Since the first grooves 12 and the second groove 13 reduce a volume of the sidewall reinforcing rubber 9, the tire weight becomes lighter than a conventional runflat tire. Also, the first groove 12 relieves a circumferential rigidity of the sidewall reinforcing rubber 9, and the second groove 13 relieves a radial rigidity of the rubber 9. This improves therefore ride comfort during normal running.

Further, the longitudinally central portion of the first groove 12 transforms like a width thereof broadens during runflat running. On this occasion, strain caused by the transformation on the first groove 12 is alleviated by the second groove 13 between the first grooves 12; thus, crack generation in the side wall reinforcing rubber 9 is prevented for long periods. Therefore, the runflat tire 1 according to the present embodiment improves the ride comfort and weight saving and prevents damage generation in the sidewall reinforcing rubber 9.

Figure 15:
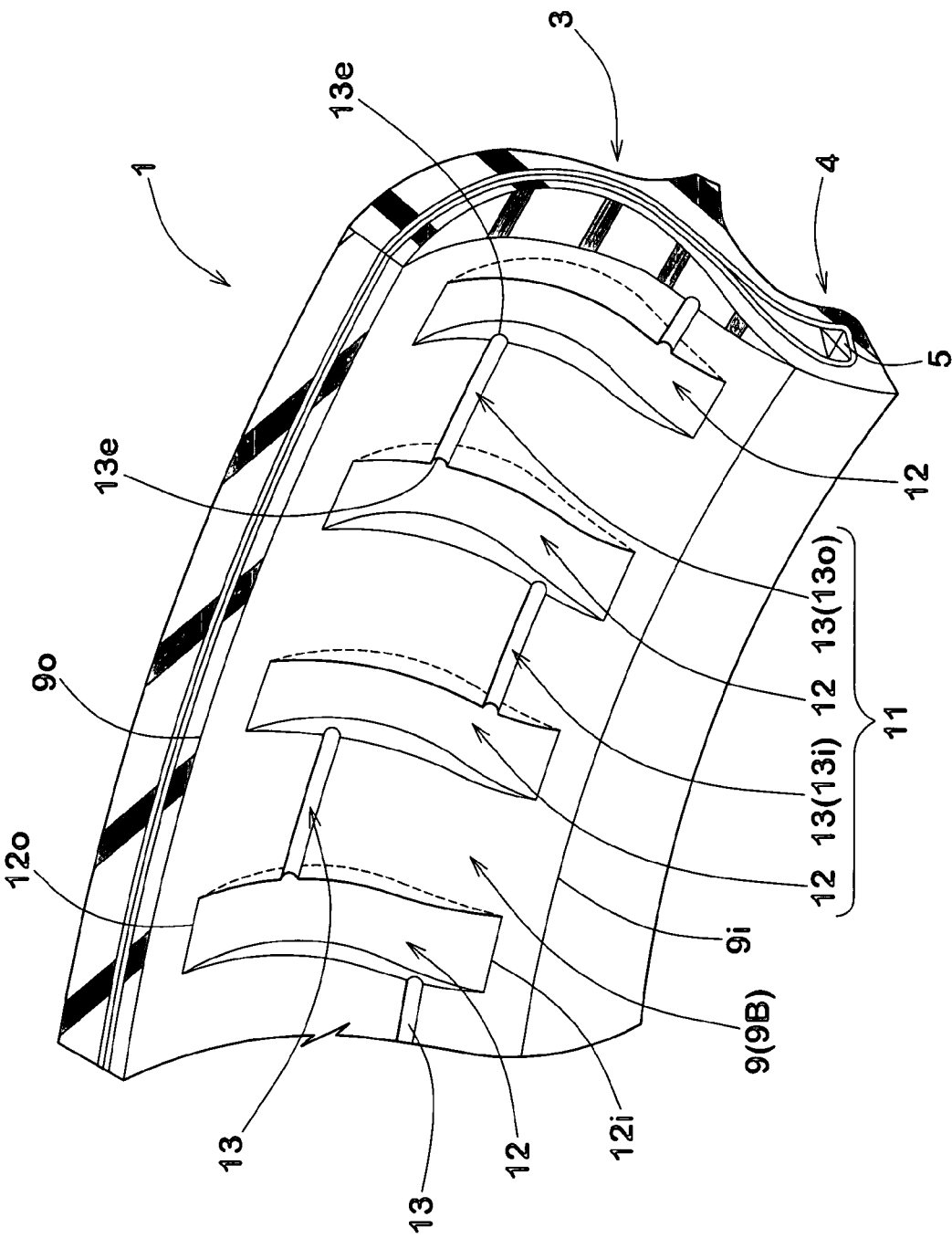
FIG. 15 is a partial perspective view of the sidewall portion viewed from the inside of the tire.

With regard to the first groove 12, the wording of "radially extending" means that a radial length of the first groove 12 is longer than a circumferential length thereof. Needless to say, the first groove 12 is therefore not limited a groove extending parallel to the radial direction of the tire as shown in FIG. 15 but may extend with inclining to the radial direction of the tire. An angle θ1 of the first groove 12 with respect to the radial direction is preferably not more than 30 degrees, more preferably not more than 15 degrees, much more preferably not more than 5 degrees in order to obtain the alleviation effect for the circumferential rigidity of the sidewall reinforcing rubber 9. Here, the width W1 of the first groove of this embodiment is preferably set as the same values of the aspect shown in FIGS. 1 to 12.

In this embodiment, the second groove 13 extends substantially parallel to the circumferential direction of the tire in an arc. Both ends 13e of the second groove 13 connect to the adjacent first grooves 12 respectively.

With regard to the second groove 13, the wording of "circumferentially extending" means that a circumferential length of the second groove 13 is longer than a radial length thereof. Needless to say, the second groove 13 is therefore not limited a groove extending parallel to the circumferential direction of the tire as shown in FIG. 15 but may extend with inclining to the tire circumferential direction. An angle θ2 of the second groove 13 with respect to the circumferential direction of the tire is preferably not more than 30 degrees, more preferably not more than 15 degrees, much more preferably not more than 5 degrees in order to obtain the alleviation effect for the radial rigidity of the sidewall reinforcing rubber 9.

In case that both the ends 13e of the adjacent second groove 13 connect to the first groove 12 respectively, the second groove 13 can alleviate more transformation of the first groove 12 during runflat running. At least one end 13e, more preferably each end 13e of the second groove 13 is therefore desirably connected to the first groove 13.

Figure 16:
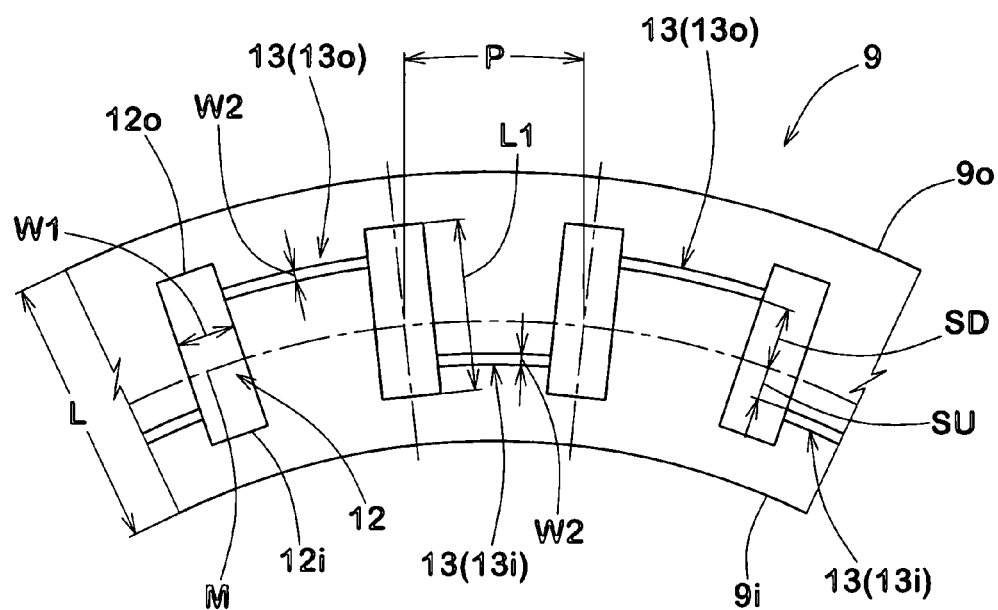
FIGS. 16 to 18 each is a side view of the sidewall reinforcing rubber viewed from the inside of the tire.

The width W2 of the second groove 13, which is a width measured as orthogonal to the longitudinal direction of the second groove 13, is preferably not less than 1 mm, more preferably not less than 2 mm, but not more than 8 mm, more preferably not more than 6 mm, as shown in FIG. 16, for example.

Figure 14:
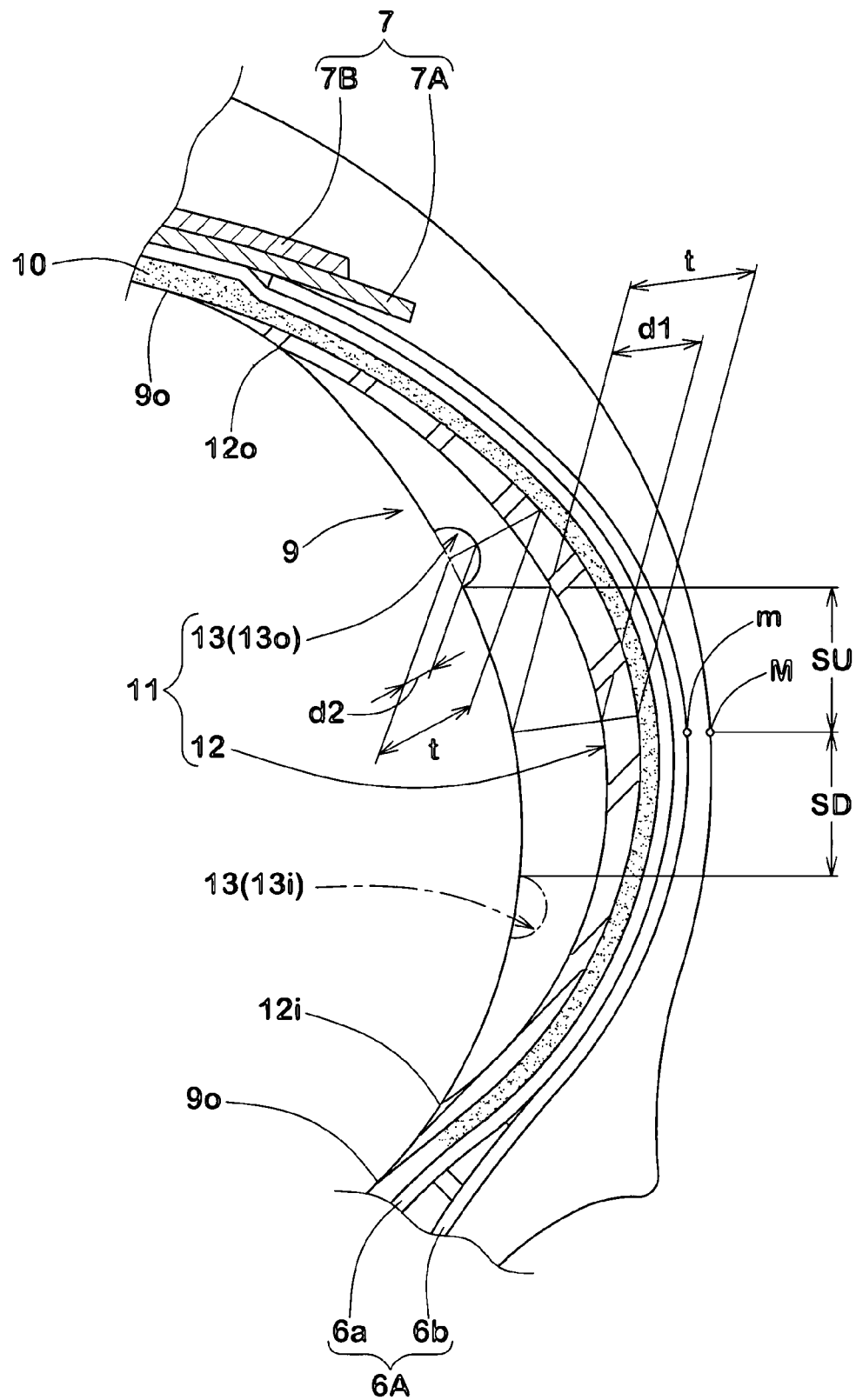
FIG. 14 is a partial enlarged view of the sidewall portion of FIG. 12.

The depth d2 of the second groove 13 is preferably not less than 5%, more preferably not less than 10%, much more preferably not less than 15%, but preferably not more than 70%, more preferably not more than 60%, much more preferably not more than 50% of the thickness t of the sidewall reinforcing rubber 9, as shown in FIG. 14.

If the width W2 or the depth d2 is too narrow or shallow, the sidewall reinforcing rubber 9 does not obtain sufficiently low radial rigidity. If the width W2 or the depth d2 is too broad or deep, load support performance of the sidewall reinforcing rubber 9 is not sufficiently improved during runflat running, and thus runflat performance is liable to decrease. Especially to prevent excessive redaction of radial rigidity of the sidewall reinforcing rubber 9, the width W2 and the depth d2 of the second groove 2 are preferably set shallower and narrower than that of the first groove 12.

Moreover, the second grooves 13 are preferably arranged in a staggering manner in the tire radial direction. Namely, the second grooves 13 adjacent to the circumferential direction of the tire extend in different radial positions of the tire, respectively in order to prevent the excessive reduction of radial rigidity of the sidewall reinforcing rubber 9. And the second groove 13 is preferably connected to a part excepting radially ends of the first groove 12 for preventing reduction of rigidity at connecting portions. In this embodiment, the second groove 13 comprises an outer second groove 13o disposed radially outside the tire maximum width point M; and an inner second groove 13i disposed radially inside the tire maximum width point M. The outer second groove 13o and the inner second groove 13i are disposed alternately in the tire circumferential direction on the inner surface of the sidewall reinforcing rubber 9.

Figure 17:
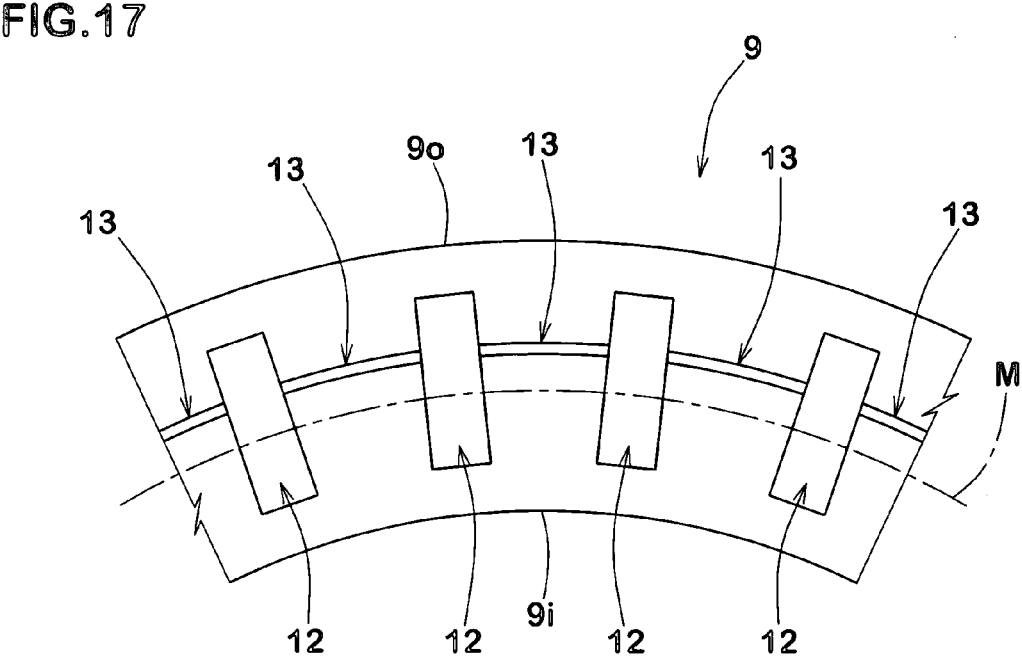

However, as shown in FIG. 17, the second grooves 13 adjacent to the circumferential direction of the tire may be arranged at the same radial heights on the inner surface of the sidewall reinforcing rubber 9.

Owing to the second groove 13 described above, the flexure of the sidewall reinforcing rubber 9 may be dispersed radially inward and/or outward of the tire, thereby reducing weight of the sidewall reinforcing rubber 9 in good balance, dispersing the strain thereof effectively, and preventing the partial fever thereof. And thus, the runflat durability improves. Moreover, the above-mentioned strain dispersing function can be improved without deteriorating the load support performance of the sidewall reinforcing rubber 9, since the second groove 13 is disposed beside the maximum width point M in which a bend of a sidewall portion 3 reaches its greatest amount. To heighten such an effect, the inner second groove 13i is preferably spaced at a distance SU radially inside from the maximum width point M, and the outer second groove 13o is preferably spaced at a distance SD radially outside from the maximum width point M. The distances SU and SD are preferably not less than 5 mm, more preferably not less than 10 mm.

Figure 18:
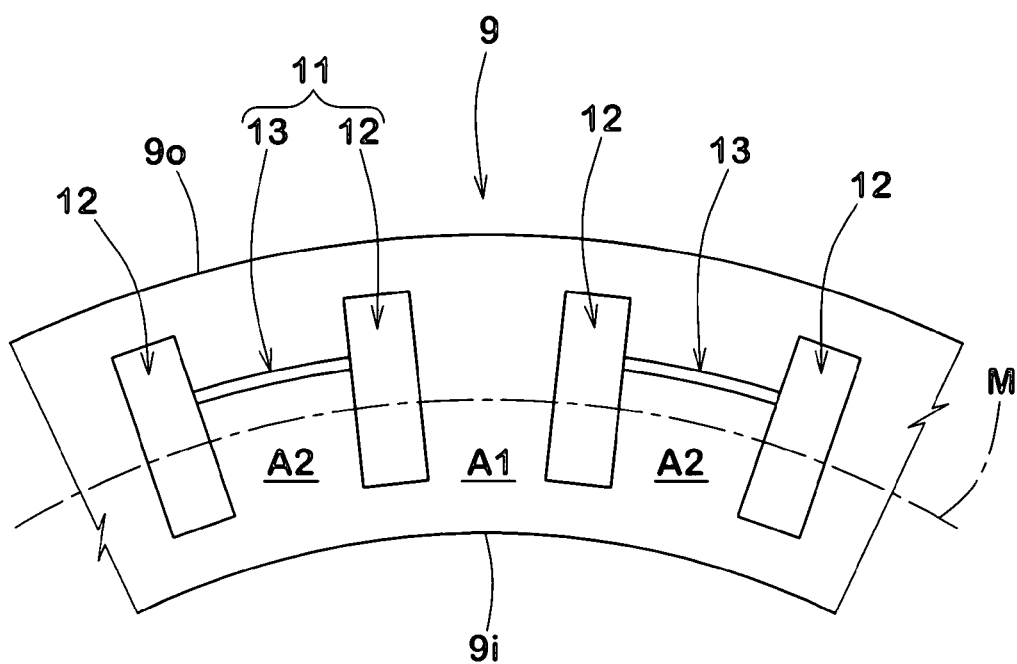

As shown in FIG. 18, the second groove 13 may be provided every other part between the first grooves 12. In other words, a placing pitch of the second groove 13 is twice that of the first groove 12. In the sidewall reinforcing rubber 9 according to the present embodiment, a high rigidity portion A1 and a low rigidity portion A2 present alternately in the circumferential direction of the tire in order to prevent radial flexure of the sidewall reinforcing rubber 9 during runflat running. The high rigidity portion A1 is provided with no second groove 13 between the first grooves 12, and the low rigidity portion A2 is provided with the second groove 13 between the first grooves 12. Meanwhile, the second groove 13 may be provided at the same height in the tire radial direction if the second groove 13 is disposed every other part between the first grooves 12 as shown in this aspect.

Figure 19A:
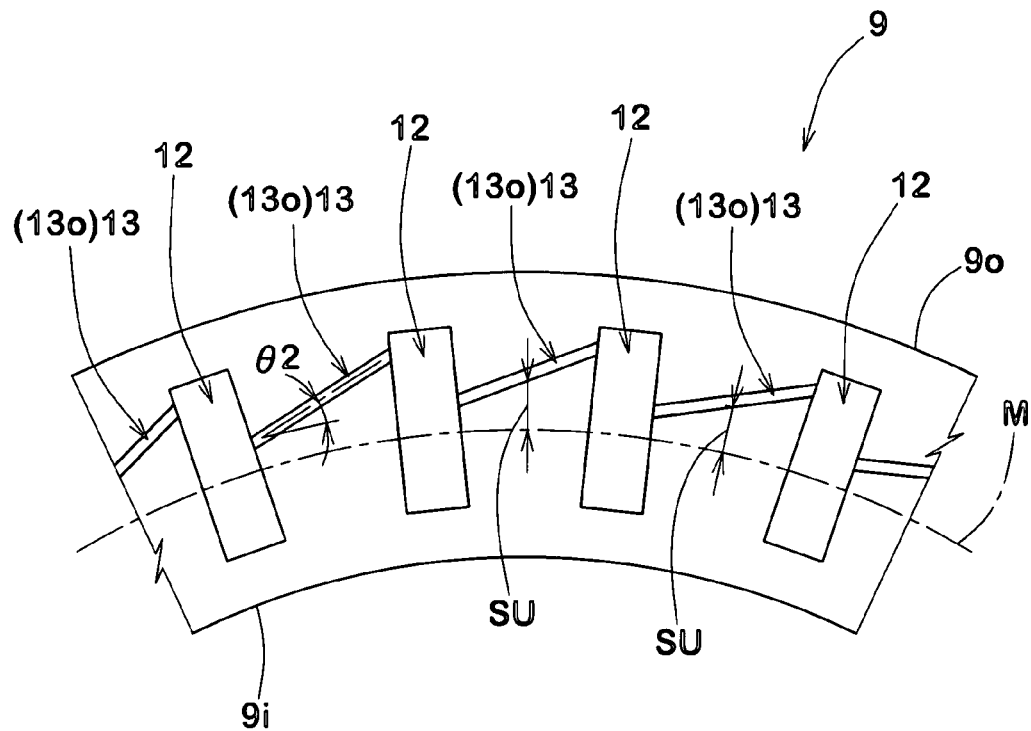
FIGS. 19(a) and 19(b) each is a side view of the sidewall reinforcing rubber viewed from the inside of the tire.
Figure 19B:
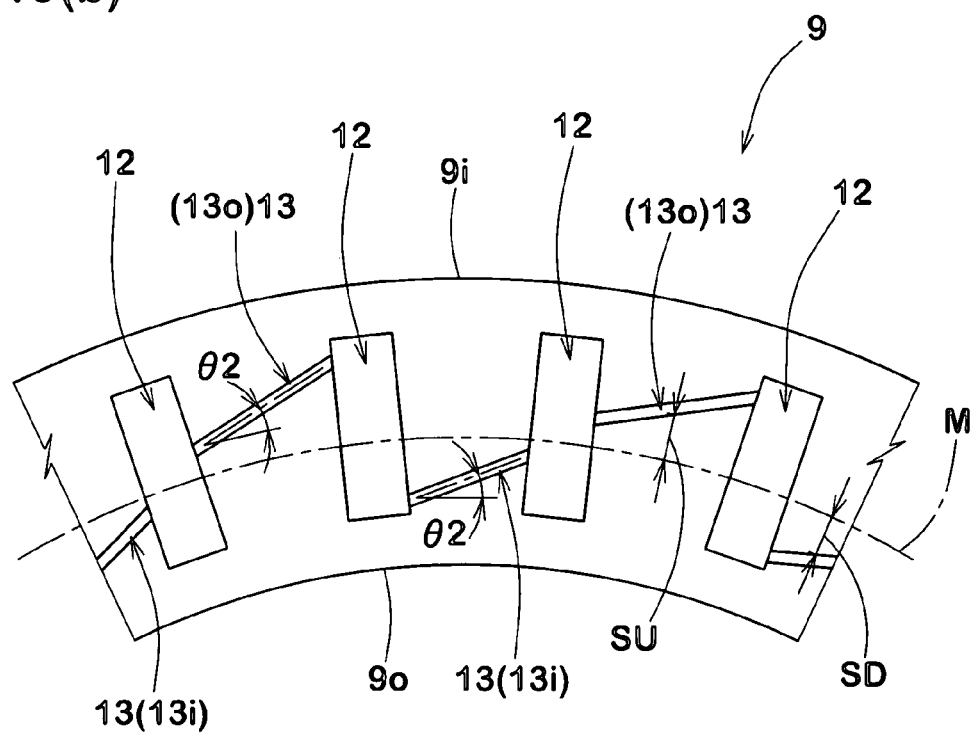

As shown in FIGS. 19(a) and 19(b), the second groove 13 may incline with respect to the circumferential direction of the tire at an angle of θ2 as noted above. In this case, the second groove 13 may comprise only the outer groove 13o as shown in FIG. 19(a), and also may comprise the outer second groove 13o and the inner second groove 13i disposed alternately as shown in FIG. 19(b).

Figure 20:
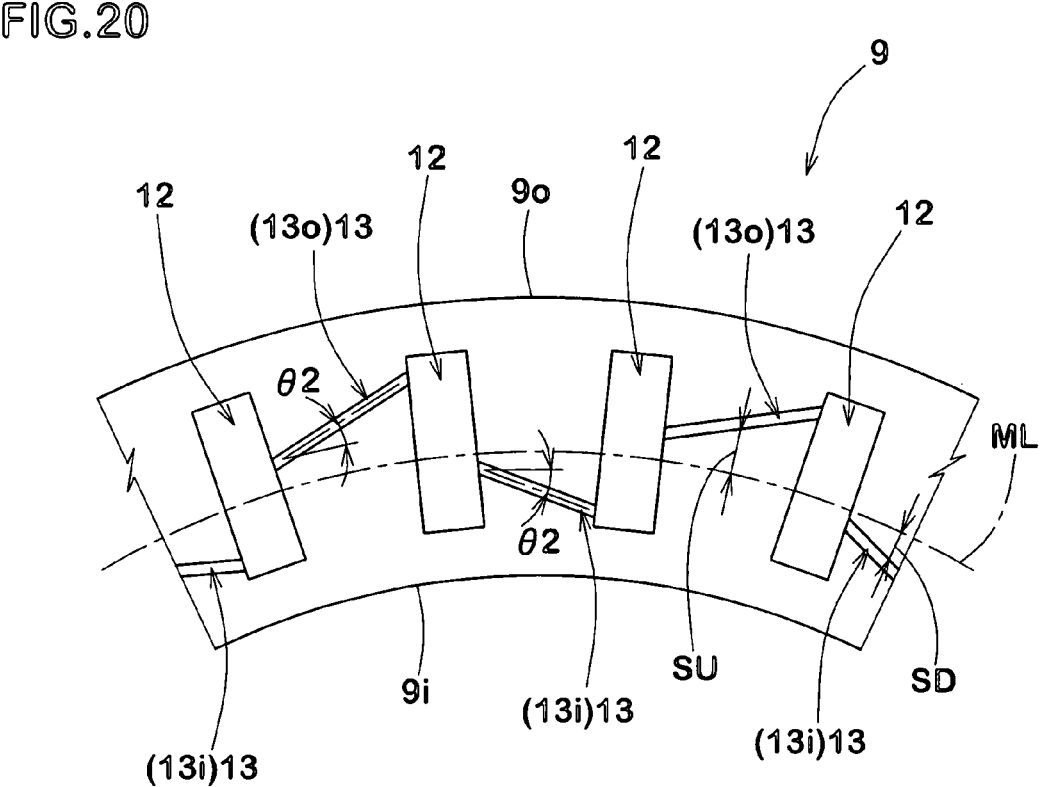
FIGS. 20 to 21 each is a side view of the sidewall reinforcing rubber viewed from the inside of the tire.

FIG. 19 shows all the second grooves 13 inclining to the same direction with respect to the tire circumferential direction. However, as shown in FIG. 20, the second groove 13 may comprise two kinds, which incline differently from each direction with respect to the circumferential direction of the tire. It is preferably to dispose these kinds alternately in the circumferential direction of the tire. Moreover, in this embodiment, the second groove 13 comprises the radially inner and outer grooves 13i and 13o; however, needless to say, it may possible to adopt between the two.

Figure 21:
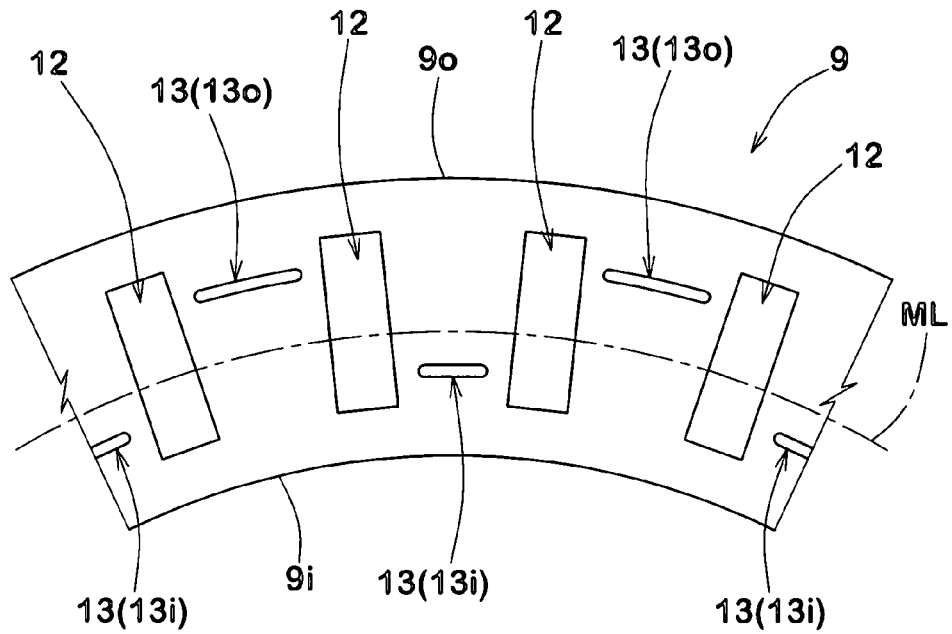

As shown in FIG. 21, it may be possible that the both of circumferential ends of the second groove 13 are disposed without connecting to the adjacent first grooves 12.

The run-flat tire 1 according to the present embodiment can easily be manufactured by cutting the inner surface 9Bi of the sidewall reinforcing rubber 9 to form the grooves 11, 12 and 13 after vulcanization of the tire. To enhance the productivity, it is preferable to form the grooves 11, 12 and 13 during vulcanization of the tire 1.

For example, a projection for forming the groove may be provided on a bladder. The bladder comes into contact with the sidewall reinforcing rubber 9 during vulcanization, and it can form the groove 11, 12 and 13 by depressing the inner surface 9B of the sidewall reinforcing rubber 9.

Figure 22:
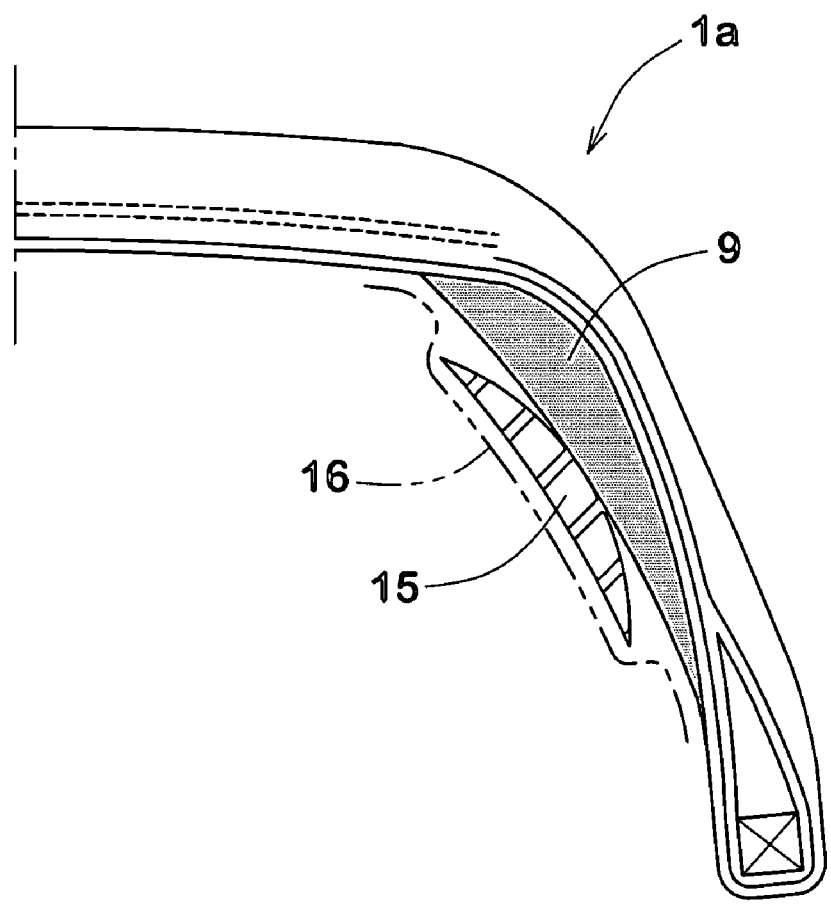
FIG. 22 is a cross sectional view of the runflat tire before vulcanization.
Figure 23:
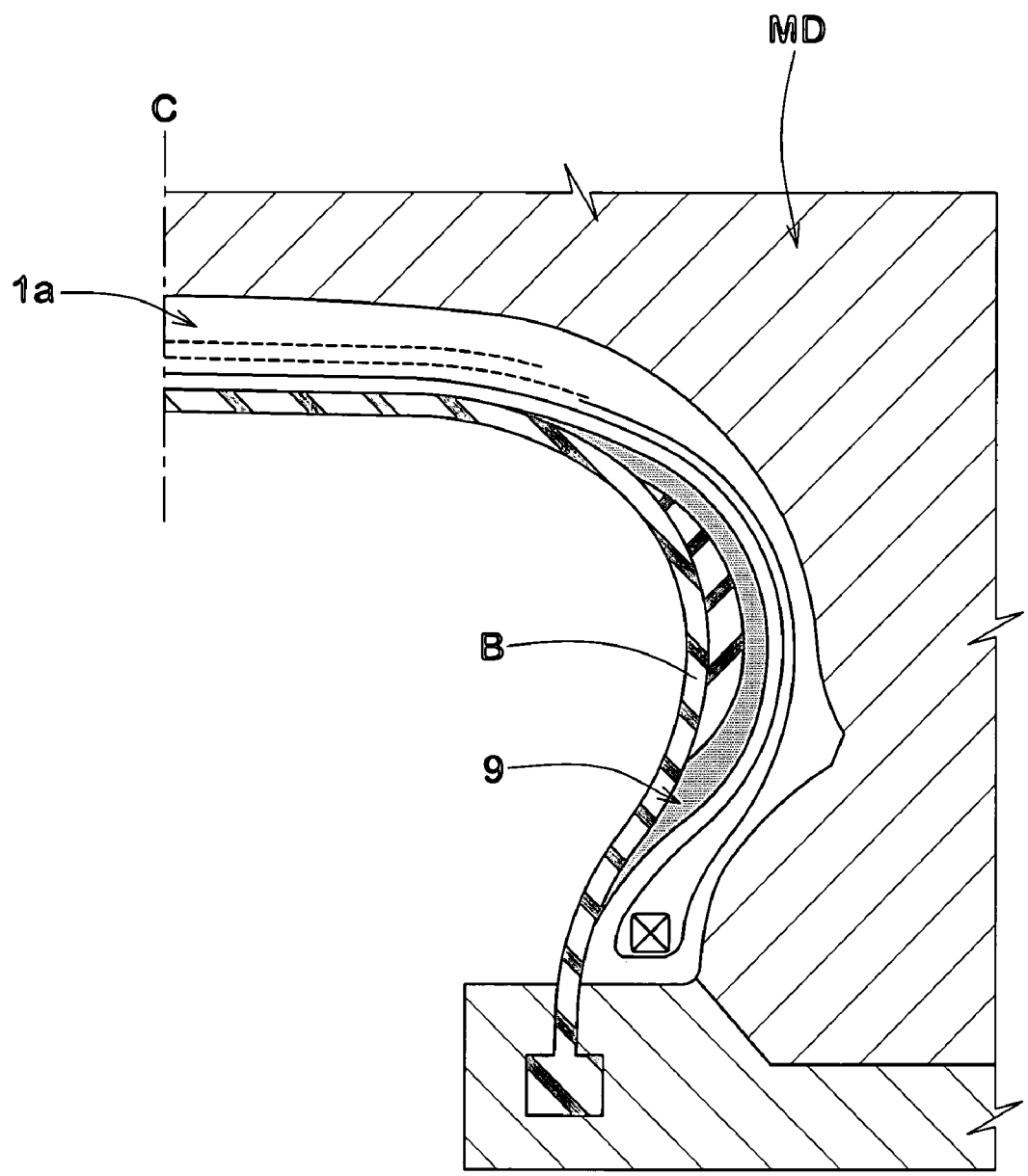
FIG. 23 is a cross sectional view of the runflat tire during vulcanization.
Figure 24:
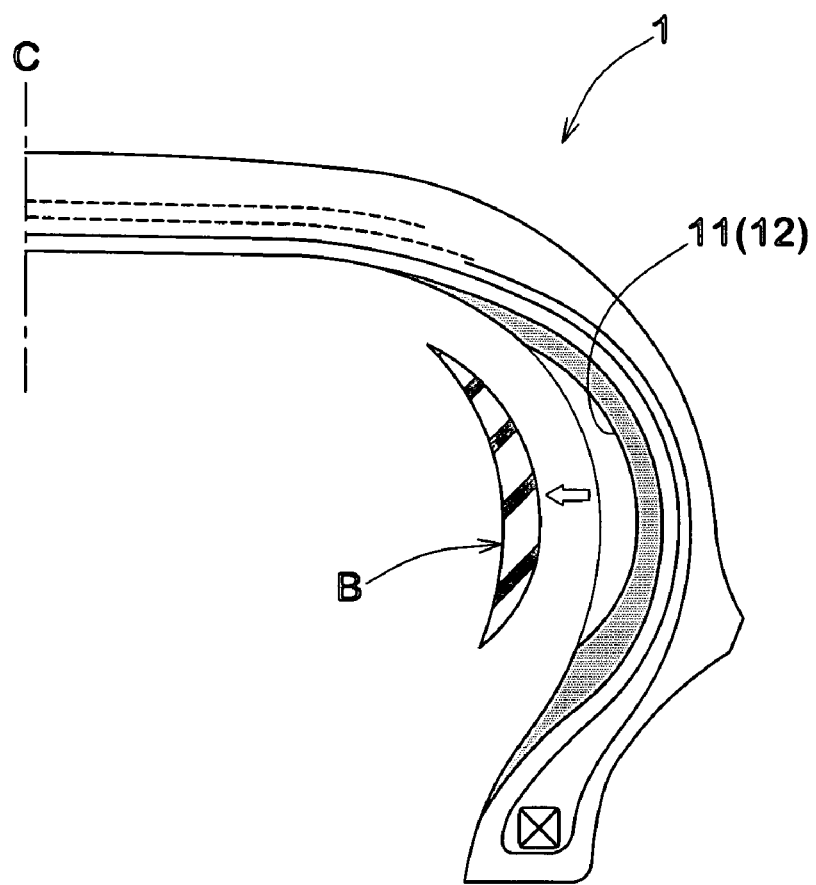
FIG. 24 is a cross sectional view of the runflat tire after vulcanization.

Moreover, as shown in FIG. 22, a heatproof block piece 15 (e.g., heatproof resin, metal or vulcanized rubber piece) which is not substantially deformed even by heat during vulcanization is disposed on the inner surface of the sidewall reinforcing rubber 9 of unvulcanized tire raw cover 1a by using a heatproof adhesive tape 16, and this is vulcanized and formed using a normal mold MD and a bladder B having a smooth surface as show in FIG. 23. The sidewall reinforcing rubber 9 is plasticized by heat at the time of vulcanization, and the heatproof block piece 15 which is pressed by the bladder B is embedded in the plasticized sidewall reinforcing rubber 9. AS shown in FIG. 24, if the heatproof block 15 is taken out from the sidewall reinforcing rubber 9 after vulcanization, the groove 11 is easily formed.

Figure 25:
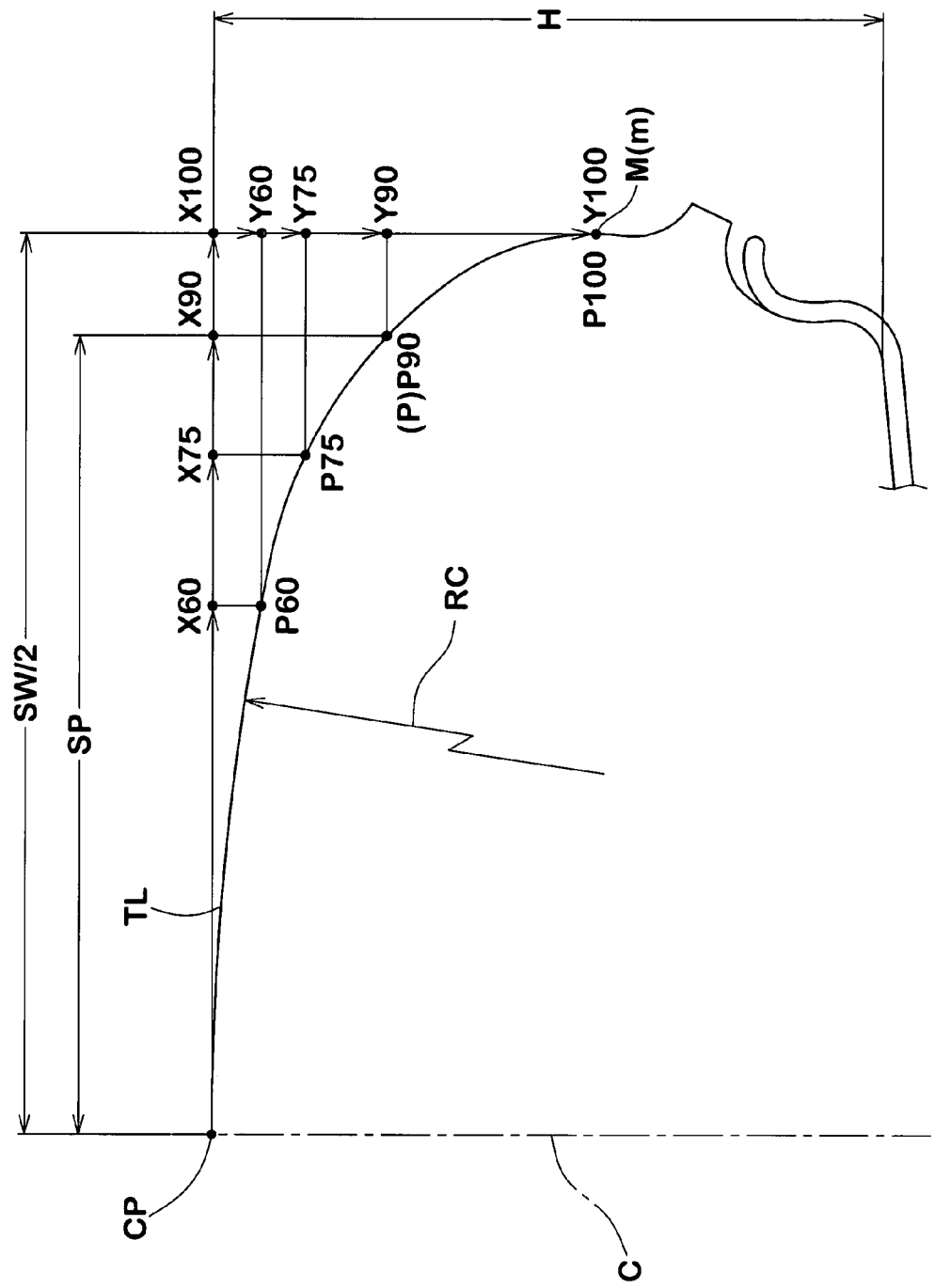
FIGS. 25 and 26 are diagrams for explaining a tire profile suitable for the runflat tire according to the present invention.

FIG. 25 shows a tire profile TL of the runflat tire 1 according to the present embodiment under the normally inflated unloaded state. The tire profile is defined based on an outer surface of the tire 1 in which all of the tread groove are filled. The tire profile TL has a multi radius or a variable radius of curvature RC which gradually decreases from the tire equator point CP to a point P90 on each side thereof so as to satisfy the following conditions:

$$0.05 < Y60/H = < 0.1$$

$$0.1 < Y75/H = < 0.2$$

$$0.2 < Y90/H = < 0.4$$

$$0.4 < Y100/H = < 0.7$$

wherein
"H" is the tire section height, and "Y60", "Y75", "Y90" and "Y100" are radial distances from the tire equator point CP to a point P60, a point P75, a point P90 and a point P100, respectively. The points P60, P75, P90 and P100 are defined on each side of the tire equator point CP as the points on the profile TL spaced apart from the tire equator point CP by axial distances of 60%, 75%, 90% and 100%, respectively, of one half of the maximum tire section width SW between the tire maximum width point M.

Figure 26:
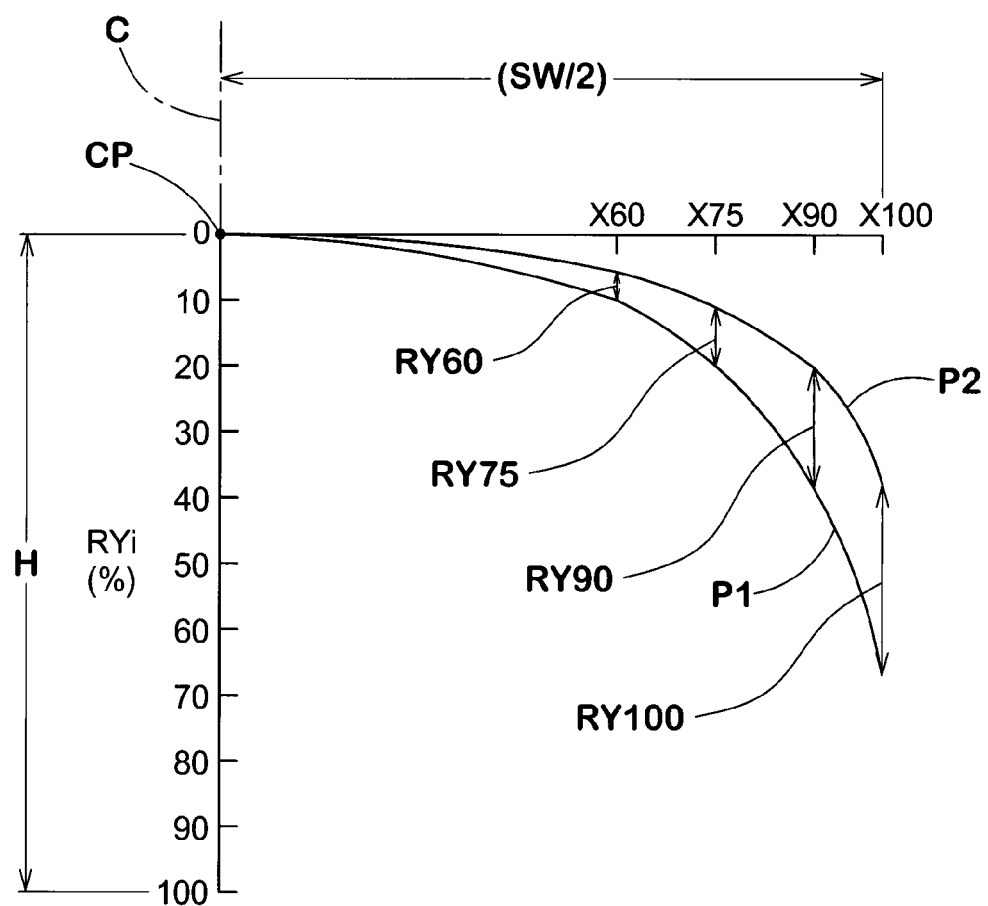

FIG. 26 is a graph showing the range RY60 for the value Y60/H, the range RY75 for the value Y75/H, the range RY90 for the value Y90/H and the range RY100 for the value Y100/H, wherein the curve P1 is an envelope of the lower limits of the ranges, and the curve P2 is an envelope of the upper limits of the ranges. The profile TL lies between the curves P1 and P2.

In the tire 1 having such special profile, when compared with the conventional profiles, the sidewall reinforcing rubber layer 9 is decreased in the dimension in the radial direction, and therefore, a significant weight reduction is possible. Further, the ground contacting width is decreased, and the ground contacting length is increased. As a result, tire running noise can be reduced, and the resistance to hydroplaning is improved. Furthermore, the vertical spring constant of the tire decreases to improve the ride comfort.

Comparison Test

Radial tires of size 245/40ZR18 for passenger cars were prepared and tested for the runflat performance, steering stability, ride comfort and tire mass. In each test tire, the sidewall reinforcing rubber had the same maximum thickness tc of 10 mm, and the same length L of 70 mm.

Further, the following profiles A and B were used as the above-mentioned tire profile TL.

|        | Tire profile |      |
| ------ | ------------ | ---- |
|        | A            | B    |
| Y60/H  | 0.09         | 0.06 |
| Y75/H  | 0.14         | 0.08 |
| Y90/H  | 0.37         | 0.19 |
| Y100/H | 0.57         | 0.57 |

Moreover, Ex.13 to Ex.15 are aspects of FIG. 7, and Ex.16 is an aspect of FIG. 8. In these Examples, the width W1a of the wide width part is 15 mm, and the width W1b of the narrow width part is 10 mm. The test methods are as follows.

Runflat Performance Test:

After leaving the test assembly of the runflat tire and a wheel rim (18×8.5 JJ) with an inner pressure of 230 kPa for 34 hours at 38 degrees Celsius, the air valve core removed from the wheel rim to deflate the tire, using a tire test drum, the deflated tire and rim assembly was run at a speed of 80 km/hr, applying a tire load of 4.14 kN. The test was carried out until the tire was broken to obtain the runflat distance. The results are indicated in Tables by an index based on Ref.1 being 100. The larger the value, the better the runflat performance.

Tire Mass:

The mass of the test tire was measured and indicated in Tables by an index based on Ref.1 being 100.

Steering Stability and Ride Comfort Tests:

using a Japanese 4300 cc FR passenger car provided on the four wheels with the test tires (inflated to 230 kPa) as a test car, the test car was run on a dry asphalt road, and the test driver evaluated steering stability based on cornering response, grip and the like. Further, the test car was run on rough roads (including asphalt road, stone-paved road and graveled road) and the test driver evaluated the ride comfort, based on harshness, damping, thrust-up, etc. The test results are indicated in Tables by an index based on Ref.1 being 100. The larger the index, the better these performances.

The specifications and the test results are shown in Tables 1 to 3.

TABLE 1

| | | Ref. 1 | Ref. 2 | Ref. 3 | Ref. 4 | Ref. 5 | Ref. 6 | Ref. 7 | Ex. 1 | Ex. 2 | Ex. 3 | Ex. 4 | Ex. 5 |
|---|---|---|---|---|---|---|---|---|---|---|---|---|---|
| Maximum thickness tc (mm) of sidewall reinforcing rubber | | 10 | 10 | 10 | 10 | 10 | 10 | 10 | 10 | 10 | 10 | 10 | 10 |
| Length L (mm) of sidewall reinforcing rubber | | 70 | 70 | 70 | 70 | 70 | 70 | 70 | 70 | 70 | 70 | 70 | 70 |
| Length L1 (mm) of groove | | — | 25 | 55 | 40 | 40 | 40 | 40 | 40 | 30 | 50 | 40 | 40 |
| Width W1 (mm) of groove | | — | 20 | 20 | 8 | 23 | 20 | 20 | 20 | 20 | 20 | 15 | 20 |
| Depth d1 (mm) of groove | | — | 4 | 4 | 4 | 4 | 4 | 4 | 4 | 4 | 4 | 4 | 4 |
| Angle θ (deg) of groove | | — | 0 | 0 | 0 | 0 | 0 | 0 | 0 | 0 | 0 | 0 | 0 |
| Pitch (mm) between grooves | | — | 40 | 40 | 40 | 40 | 23 | 63 | 40 | 40 | 40 | 40 | 40 |
| Profile of tire outer surface* | | B | B | B | B | B | B | B | A | A | A | A | B |
| Test result | Run-flat durability (index) | 100 | 98 | 85 | 98 | 84 | 85 | 97 | 95 | 96 | 93 | 94 | 95 |
| | Tire mass (index) | 100 | 98.7 | 97.2 | 99.2 | 97.7 | 96.5 | 98.7 | 94 | 94.5 | 93.5 | 94.5 | 98 |
| | Riding comfort (index) | 100 | 102 | 110 | 103 | 112 | 115 | 103 | 110 | 108 | 112 | 109 | 107 |
| | Steering stability (index) | 100 | 98 | 95 | 97 | 94 | 93 | 98 | 96 | 97 | 95 | 96 | 96 |

*A: RY60 = 0.09, RY75 = 0.14, RY90 = 0.37, RY100 = 0.57
*B: RY60 = 0.06, RY75 = 0.08, RY90 = 0.19, RY100 = 0.57

TABLE 2

| | | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|
| Maximum thickness tc (mm) of sidewall reinforcing rubber | | 10 | 10 | 10 | 10 | 10 | 10 | 10 | 10 | 10 | 10 | 10 |
| Length L (mm) of sidewall reinforcing rubber | | 70 | 70 | 70 | 70 | 70 | 70 | 70 | 70 | 70 | 70 | 70 |
| Length L1 (mm) of groove | | 40 | 40 | 40 | 40 | 40 | 40 | 40 | 10/30 (FIG. 7) | 10/30 (FIG. 7) | 10/30 (FIG. 7) | 10/30 (FIG. 8) |
| Width W1 (mm) of groove | | 10 | 20 | 20 | 20 | 20 | 20 | 20 | 15/10 | 15/10 | 15/10 | 15/10 |
| Depth d1 (mm) of groove | | 4 | 4 | 4 | 4 | 4 | 2 | 6 | 4 | 4 | 4 | 4 |
| Angle θ (deg) of groove | | 0 | 0 | 0 | 0 | 0 | 0 | 0 | 0 | 0 | 0 | 0 |
| Pitch (mm) between grooves | | 40 | 25 | 30 | 50 | 60 | 40 | 40 | 40 | 50 | 30 | 40 |
| Profile of tire outer surface* | | A | A | A | A | A | A | A | A | A | A | A |
| Test result | Run-flat durability (index) | 97 | 90 | 93 | 95 | 96 | 98 | 95 | 96 | 98 | 94 | 97 |
| | Tire mass (index) | 95 | 92.7 | 93.3 | 94.4 | 94.6 | 95 | 92.9 | 94.9 | 95.1 | 94.5 | 94.9 |
| | Riding comfort (index) | 107 | 114 | 111 | 108 | 107 | 106 | 114 | 108 | 106 | 111 | 106 |
| | Steering stability (index) | 98 | 94 | 96 | 97 | 98 | 99 | 95 | 97 | 98 | 95 | 98 |

*A: RY60 = 0.09, RY75 = 0.14, RY90 = 0.37, RY100 = 0.57
*B: RY60 = 0.06, RY75 = 0.08, RY90 = 0.19, RY100 = 0.57

TABLE 3

|  |  | Ex. 17 | Ex. 18 | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|---|---|
| Maximum thickness tc (mm) of sidewall reinforcing rubber | | 10 | 10 | 10 | 10 | 10 | 10 | 10 | 10 | 10 | 10 | 10 |
| Length L (mm) of sidewall reinforcing rubber | | 70 | 70 | 70 | 70 | 70 | 70 | 70 | 70 | 70 | 70 | 70 |
| Length L1 (mm) of groove | | 40 | 40 | 40 | 40 | 40 | 40 | 40 | 40 | 40 | 40 | 40 |
| Width W1 (mm) of groove | | 20 | 20 | 20 | 20 | 20 | 20 | 20 | 20 | 20 | 20 | 20 |
| Depth d1 (mm) of groove | | 4 | 4 | 4 | 4 | 4 | 4 | 4 | 4 | 4 | 4 | 4 |
| Angle θ (deg) of groove | | 25 | 35 | 45 | 55 | 65 | 65 | 45 | 25 | 65 | 45 | 25 |
| Pitch (mm) between grooves | | 40 | 40 | 40 | 40 | 40 | 40 | 40 | 40 | 40 | 40 | 40 |
| Direction of inclination of grooves on both sidewall reinforcing rubbers | | reverse | reverse | reverse | reverse | reverse | same (FIG. 10) | same (FIG. 10) | same (FIG. 10) | same (FIG. 11) | same (FIG. 11) | same (FIG. 11) |
| Profile of tire outer surface* | | A | A | A | A | A | A | A | A | A | A | A |
| Test result | Run-flat durability (index) | 95 | 94 | 93 | 91 | 90 | 90 | 93 | 95 | 90 | 92 | 94 |
| | Tire mass (index) | 94 | 94 | 94 | 94 | 94 | 94 | 94 | 94 | 94 | 94 | 94 |
| | Riding comfort (index) | 110 | 111 | 112 | 116 | 116 | 116 | 112 | 110 | 118 | 114 | 111 |
| | Steering stability (index) | 96 | 96 | 95 | 93 | 92 | 94 | 96 | 97 | 91 | 93 | 95 |

*A: RY60 = 0.09, RY75 = 0.14, RY90 = 0.37, RY100 = 0.57
*B: RY60 = 0.06, RY75 = 0.08, RY90 = 0.19, RY100 = 0.57

From the test results, it was confirmed that the resistance to pinch cut and runflat performance can be improved without a significant increase of the tire mass.

Next, radial tires of size 245/40ZR18 for passenger according to other aspects shown in FIGS. 16, 17, 18, 19(a), 19(b) and 20 were also prepared and tested for the runflat performance, tire mass and longitudinal rigidity.

In each test tire, the sidewall reinforcing rubber had the same maximum thickness of 10 mm, the same length L of 60 mm and the same mass. Further, in each tire, 60 first grooves are arranged in regularly in each sidewall reinforcing rubber, and the width W1 of the first groove of each test tire is 8 mm, the length L1 thereof is 30 mm and the depth d1 thereof is 6 mm except for References 8 and 9. These two references 8 and 9 have no first groove. Moreover, the cross section of the second groove is a half circle.

The test method of the longitudinal rigidity is as follows.
Longitudinal Rigidity:

An amount of longitudinal flexure of Each test tire was measured under an inner pressure of 200 kPa and a longitudinal load of 4 KN, and indicated in Tables 4 by an index based on Ref.8 being 100. The larger the index, the better ride comfort.

The specifications and the test results are shown in Table 4.

TABLE 4

|  |  | Ref. 8 | Ref. 9 | Ref. 10 | Ref. 11 | Ex. 28 | Ex. 29 | Ex. 30 | Ex. 31 | Ex. 32 | Ex. 33 | Ex. 34 |
|---|---|---|---|---|---|---|---|---|---|---|---|---|
| Type of second grooves | | — | — | — | — | FIG. 17 | FIG. 18 | FIG. 16 | FIG. 19 (b) | FIG. 20 | FIG. 16 | FIG. 19 (a) |
| Spec. of second groove | | | | | | | | | | | | |
| Width W2 (mm) | | | | | | 3.0 | 3.0 | 3.0 | 3.0 | 3.0 | 3.0 | 3.0 |
| Depth d2 (mm) | | Absence | Absence | Absence | Absence | 3.0 | 3.0 | 3.0 | 3.0 | 3.0 | 3.0 | 3.0 |
| Distance SU (mm) (*2) | | | | | | 10 | 10 | 10 | 10 | 10 | 10 | 10 |
| Distance SD (mm) (*2) | | | | | | — | — | 10 | 10 | 10 | 10 | 10 |
| Angle θ2 (deg) | | | | | | 0 | 0 | 0 | 15 | 15 | 0 | 15 |
| Profile of tire outer surface (*1) | | B | A | B | A | A | A | A | A | A | B | A |
| Test result | Runflat durability (index) | 100 | 99 | 97 | 96 | 90 | 94 | 92 | 92 | 92 | 93 | 93 |
| | Tire mass (index) | 100 | 95 | 98.5 | 93.5 | 93 | 93.2 | 93 | 92.9 | 92.9 | 98 | 92.9 |
| | Longitudinal rigidity (index) | 100 | 95 | 98 | 93 | 88 | 91 | 90 | 90 | 90 | 95 | 91 |

(*1) A: RY60 = 0.09, RY75 = 0.14, RY90 = 0.37, RY100 = 0.57
(*1) B: RY60 = 0.06, RY75 = 0.08, RY90 = 0.19, RY100 = 0.57
(*2) Distances SU and SD are measured at a circumferential center portion of second groove.

The invention claimed is:

1. A runflat tire comprising
a tread portion,
a pair of sidewall portions,
a pair of bead portions each having a bead core therein,
a carcass extending between the bead cores, and
a sidewall reinforcing rubber disposed axially inside the carcass in each sidewall portion, wherein
each sidewall reinforcing rubber is provided with a plurality of grooves extending on an axially inner surface thereof,
each of the plurality of grooves has a radially outer end and a radially inner end within the inner surface of the sidewall reinforcing rubber,
the grooves are arranged in a circumferential direction of the tire with a pitch P in a range of from 25 to 60 mm, and each has a length of from 30 to 50 mm and a width of from 10 to 20 mm and
the grooves include at least one T-shaped groove having a wide width part and a narrow width part being connected to the wide part so that a shape of the groove has a T-shape.

2. The runflat tire according to claim 1, wherein each groove is not connected each other.

3. The runflat tire according to claim 1, wherein
the T-shaped groove is provided so that the wide width part thereof locates on a side of the tread portion.

4. The runflat tire according to claim 1, wherein
said grooves include at least one inclined groove, and
an angle of the inclined groove is in a range of from 25 to 65 degrees with respect to a radial direction of the tire.

5. The runflat tire according to claim 1, wherein
said grooves include at least one inclined groove with respect to a radial direction of the tire on each sidewall reinforcing rubber, and
all of inclined grooves are inclined in the same direction with respect to the radial direction of the tire.

6. The runflat tire according to claim 1, wherein
said grooves include at least one inclined groove with respect to a radial direction of the tire on each sidewall reinforcing rubber, and
the inclined groove provided on one sidewall reinforcing rubber is inclined in the different direction from the inclined groove on the other sidewall reinforcing rubber.

7. The runflat tire according to claim 1, which is provided with a tire profile having a radius of curvature which gradually decreases from the tire equator point CP to a point P90 on each side thereof so as to satisfy the following conditions:

$$0.05 < Y60/H = < 0.1$$

$$0.1 < Y75/H = < 0.2$$

$$0.2 < Y90/H = < 0.4$$

$$0.4 < Y100/H = <\mathbf{0.7}$$

wherein
"H" is the section height of the tire, and
"Y60", "Y75", "Y90" and "Y100" are radial distances from the tire equator point CP to a point P60, a point P75, the point P90 and a point P100, respectively,
wherein
the points P60, P75, P90 and P100 are defined on each side of the tire equator point CP as the points on the profile spaced apart from the tire equator point CP by axial distances of 60%, 75%, 90% and 100%, respectively, of one half of the maximum tire section width.

8. A runflat tire comprising
a tread portion,
a pair of sidewall portions,
a pair of bead portions each having a bead core therein,
a carcass extending between the bead cores, and
a sidewall reinforcing rubber disposed axially inside the carcass in each sidewall portion, wherein
each sidewall reinforcing rubber is provided with a plurality of grooves extending on an axially inner surface thereof, and said grooves comprise
a plurality of radially extending first grooves arranged in a circumferential direction of the tire, the first grooves having a radial length longer than a circumferential length thereof, and
a plurality of circumferentially extending second grooves provided between said first grooves, the second grooves having a circumferential length longer than a radial length thereof,
wherein the second grooves adjacent to each other in the circumferential direction of the tire are disposed at radially different positions from each other.

9. The runflat tire according to claim 8, wherein
each end of the second groove is connected to the first groove.

10. The runflat tire according to claim 8, wherein
one second groove is provided every other part between the first grooves.

11. The runflat tire according to claim 9, wherein
the width and the depth of each second groove are smaller than those of the first grooves, respectively.

12. The runflat tire according to claim 8, which is provided with a tire profile having a radius of curvature which gradually decreases from the tire equator point CP to a point P90 on each side thereof so as to satisfy the following conditions:

$$0.05 < Y60/H = < 0.1$$

$$0.1 < Y75/H = < 0.2$$

$$0.2 < Y90/H = < 0.4$$

$$0.4 < Y100/H = <\mathbf{0.7}$$

wherein
"H" is the section height of the tire, and
"Y60", "Y75", "Y90" and "Y100" are radial distances from the tire equator point CP to a point P60, a point P75, the point P90 and a point P100, respectively,
wherein
the points P60, P75, P90 and P100 are defined on each side of the tire equator point CP as the points on the profile spaced apart from the tire equator point CP by axial distances of 60%, 75%, 90% and 100%, respectively, of one half of the maximum tire section width.

13. The runflat tire according to claim 8, wherein each of the first grooves has a radially outer end and a radially inner end within the inner surface of the sidewall reinforcing rubber.

14. The runflat tire according to claim 8, wherein
each of the second grooves are located between the adjacent first grooves arranged in the circumferential direction of the tire.

15. The runflat tire according to claim 8, wherein the first grooves are arranged in a single row in the circumferential direction of the tire.

* * * * *